US 6,554,730 B1

(12) United States Patent
Sakai et al.

(10) Patent No.: US 6,554,730 B1
(45) Date of Patent: *Apr. 29, 2003

(54) AUXILIARY DEVICE FOR BICYCLE WITH TRACTION ROLLER TYPE GEAR

(75) Inventors: Koichi Sakai, Kanagawa-ken (JP); Ryoichi Otaki, Kanagawa-ken (JP); Hisashi Machida, Kanagawa-ken (JP); Atsushi Ozawa, Kanagawa-ken (JP)

(73) Assignee: NSK Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,708

(22) Filed: Jan. 28, 1998

(30) Foreign Application Priority Data

| Jan. 29, 1997 | (JP) | 9-015237 |
| Mar. 10, 1997 | (JP) | 9-054864 |
| Mar. 14, 1997 | (JP) | 9-061329 |
| Mar. 14, 1997 | (JP) | 9-061332 |
| Mar. 28, 1997 | (JP) | 9-077954 |
| Apr. 1, 1997 | (JP) | 9-082646 |
| Apr. 10, 1997 | (JP) | 9-092422 |
| Apr. 10, 1997 | (JP) | 9-092423 |
| Sep. 26, 1997 | (JP) | 9-262373 |

(51) Int. Cl.$^7$ .................................... B62M 23/02
(52) U.S. Cl. .................... 475/195; 180/207; 476/61
(58) Field of Search .................. 475/195, 346, 475/347; 180/205, 206, 207, 220, 230; 476/61

(56) References Cited

U.S. PATENT DOCUMENTS

| 1,093,922 A | 4/1914 | Dieterich |
| 3,380,312 A | 4/1968 | Barske |
| 3,776,051 A | 12/1973 | Kraus |
| 3,848,476 A | 11/1974 | Kraus |
| 3,941,004 A | 3/1976 | Kraus |
| 3,945,270 A | 3/1976 | Nelson et al. |
| 4,408,503 A | 10/1983 | Kraus |
| 4,481,842 A | 11/1984 | Nelson |
| 4,491,038 A | 1/1985 | Kraus |
| 4,555,963 A | 12/1985 | Nelson |
| 4,709,589 A | 12/1987 | Kraus |
| 5,570,752 A | * 11/1996 | Takata ................. 180/206 |
| 5,749,429 A | * 5/1998 | Yamanuchi et al. ...... 180/205 |
| 5,931,759 A | * 8/1999 | Otaki et al. ............... 475/195 |

FOREIGN PATENT DOCUMENTS

| JP | 6-307512 | 11/1994 |
| JP | 7-95744 | 4/1995 |
| JP | 7-117779 | 5/1995 |

OTHER PUBLICATIONS

Patent abstracts of Japan, vol. 095, No. 007, Aug. 31, 1995 & JP 07 095744 A (Yamaha Motor Co. Ltd.), Apr. 7, 1995.

* cited by examiner

*Primary Examiner*—Ankur Parekh
(74) *Attorney, Agent, or Firm*—Crowell & Moring LLP

(57) ABSTRACT

An auxiliary equipment of driving force for bicycle is provided wherein a reduction gear of the traction roller type is adopted, and the contact pressure between the outer peripheral surfaces of the traction rollers and the outer peripheral surface of the rotatable shaft and the inner peripheral surface of the outer ring is controlled corresponding to the torque to be transmitted, so that the battery is less exhausted and that the traveling distance of the electrically power augmented bicycle is prolonged.

5 Claims, 22 Drawing Sheets

AUXILIARY DEVICE FOR BICYCLE WITH TRACTION ROLLER TYPE GEAR

FIELD OF THE INVENTION

The present invention is related to an auxiliary equipment of driving force to be installed in a drive system of an electrically power augmented bicycle which has an electric motor and is capable of reducing pedaling forces for the pedals of the bicycle whereby the number of revolutions of a rotatable shaft of the electric motor is reduced before transmitting to the pedal shaft.

BACKGROUND OF THE INVENTION

Recently becoming popular is an electrically power augmented bicycle which utilizes the power of an electric motor to reduce the pedaling forces of the rider to the pedals of the bicycle, so that even the rider with weak power can ride up along the slope, and that the fatigue of the rider is reduced.

The structure of the electrically power augmented bicycle is disclosed for example in Japanese Patent First Publication Toku Kai Hei7-95744. In the electrically power augmented bicycle as described in this publication, as shown in FIG. 1, a pedal shaft 3 is rotatingly driven through a pair of cranks 2 by pedaling a pair of pedals 1 (see FIG. 2) of the bicycle (not shown) to produce a torque. In the auxiliary equipment of driving force for bicycling installed in the bicycle, a driving force is added to the pedal shaft 3, such that the driving force has a magnitude corresponding to the torque applied through the pedals 1 and is added to the torque through the pedals 1.

The auxiliary equipment of driving force for bicycle comprises a battery (not illustrated), an electric motor 5 (see FIGS. 2, 3 and 6) to rotate its rotatable shaft 4 in a predetermined direction based on the electric power from the battery, and a reduction gear apparatus 31 provided between the rotatable shaft 4 of the motor 5 and the pedal shaft 3. The reduction gear apparatus 31 contains a planetary roller type reduction gear 32.

The reason for using the reduction gear apparatus 31 containing the planetary roller type reduction gear 32 for the auxiliary equipment of driving force is as follows;

In order to secure the efficiency of the motor 5 and to prolong the life of the battery so as to make the traveling length long, the motor 5 must be rotated at a high speed. The term "traveling length" means the "traveling length with an auxiliary power used" throughout the present specification.

On the other hand, the driving force for rotation must be applied to the pedal shaft 3 at a relatively low speed and with a large torque. Therefore, the reduction gear apparatus 31 is provided between the electric motor 5 and the pedal shaft 3 to reduce the rotating speed of the rotatable shaft 4 of the motor 5 and to increase the torque for transmission of the torque to the pedal shaft 3.

The reduction gear of the planetary roller type 32 is placed at the first stage of the reduction gear apparatus 31 to prevent uncomfortable noise from being produced from the reduction gear apparatus 31.

Specifically, the speed reduction apparatus using "gears" such as the planetary gear type has a good transmission efficiency but produces jarring high frequency noise during high speed operation. Accordingly, the first stage in the, reduction gear apparatus having the highest operation speed is desirably provided with the reduction gear of the planetary roller type 32 with low noise so that the noise produced during the operation of the reduction gear apparatus 31 is reduced Incidentally, the auxiliary equipment of driving force for bicycle described in Japanese Patent First Publication Toku Kai Hei7-95744 is provided with a reduction gear of the planetary roller type 32 at the first stage, with a reduction gear of the bevel gear type 33 at the intermediate stage, and with a reduction gear of the planetary gear type 34 at the final stage. Disposed between the reduction gear of the planetary roller type 32 and the bevel gear type reduction gear 33 is a one way clutch 35 such as roller clutch which can afford to transmit the rotation force only to the pedal shaft 3 from the motor 5. The one way clutch 35 is utilized to separate the pedal shaft 3 from the rotatable shaft 4 of the motor 5 to prevent the existence of the motor from being a resistance against the running in the state of running without pedaling such as inertia moving, downward riding.

The reduction gear of the planetary roller type 32 having the auxiliary equipment of driving force for bicycle as described in Japanese Patent First Publication Toku Kai Hei7-95744 comprises a housing 36 fixed so as to cover the end of the rotatable shaft 4 of the motor 5, four support shafts 37 provided in parallel with the rotatable shaft 4 around the rotatable shaft 4 within the housing 36, four planet rollers 38 rotatably supported by the support shafts 37, and an outer ring 39 having a cylindrical inner surface and fixed to a portion surrounding the planet rollers 38 within the housing 36. Disposed to support the support shafts 37 is a connecting member 40 which can function as an output shaft of the reduction gear of the planetary roller type 32, so that the spinning action of the planet rollers 38 can be taken out as a rotating output of the reduction gear of the planetary roller type 32.

The outer peripheral surfaces of the planet rollers 38 are abutted to the outer peripheral surface of the rotatable shaft 4 of the motor 5 and the inner peripheral surface of the outer ring 39.

In the case of the auxiliary equipment of driving force for bicycle as disclosed in Japanese Patent First Publication Toku Kai Hei7-95744, it is hard to make high the efficiency of transmission of the reduction gear of the planetary roller type 32 in the whole range, which is a bar in making long the traveling distance of the electrically power augmented bicycle.

This Reason is as Follows:

The outer peripheral surfaces of the planet rollers 38 must not slip on the outer peripheral surface of the rotatable shaft 4 of the motor 5 and on the inner peripheral surface of the outer ring 39 at the contact portions to secure the efficiency of transmission of the reduction gear of the planetary roller type 32. In addition, the contact pressure between the pairs of the peripheral surfaces at the contact portions must be made large to avoid the slip at the contact portions. Accordingly, in the reduction gear of the planetary roller type 32 installed in the conventional auxiliary equipment of driving force for bicycle, the planet rollers 38 are provided under pressure in interference fitting between the outer peripheral surface of the rotatable shaft 4 of the motor 5 and the inner peripheral surface of the outer ring 39 to secure the contact pressure at the contact portions.

Provided that the contact pressure is constant, as the torque transmitted through the reduction gear of the planetary roller type 32 is larger, the surface portions at the contact portions are easier to slip. Accordingly, conventionally, the contact pressure is controlled to be large, so that the surface portions at the contact portions do not slip with reference to each other even in the state where the torque transmitted through the reduction gear of the planetary roller type 32 is at a maximum as in riding upward along the steep slope. However, when the contact pressure is larger between the peripheral surfaces in rolling contact, the rolling resistance is larger, so that the power loss in the reduction gear of the planetary roller type 33Z is larger.

Specifically, in the state such as in riding along a flat land at a constant speed where the torque transmitted through the reduction gear of the planetary roller type 32 is small and there is no possibility of relative slip between the surface portions at the contact portions even with a low contact pressure, an excessive contact pressure is applied to the contact portions, so that the loss inside the reduction gear of the planetary roller type 32 is larger. Consequently, the transmission efficiency is low at the constant speed along the flat land, which is the most typical traveling style, so that the battery to supply power to the motor 5 is outstandingly exhausted. As a result, it is hard to prolong the traveling distance of the electrically power augmented bicycle.

SUMMARY OF THE INVENTION

An objective of the present invention is to provide an auxiliary equipment of driving force for bicycle wherein a reduction gear of the traction roller type having a structure different from the reduction gear of the planetary roller type is adopted taking into consideration the circumstances above, where the contact pressure between the outer peripheral surfaces of the traction rollers and the outer peripheral surface of the rotatable shaft and the inner peripheral surface of the outer ring is controlled corresponding to the torque to be transmitted, so that the battery is less exhausted and that the traveling distance of the electrically power augmented bicycle is prolonged.

DETAILED DESCRIPTION OF THE INVENTION

Figure 1:
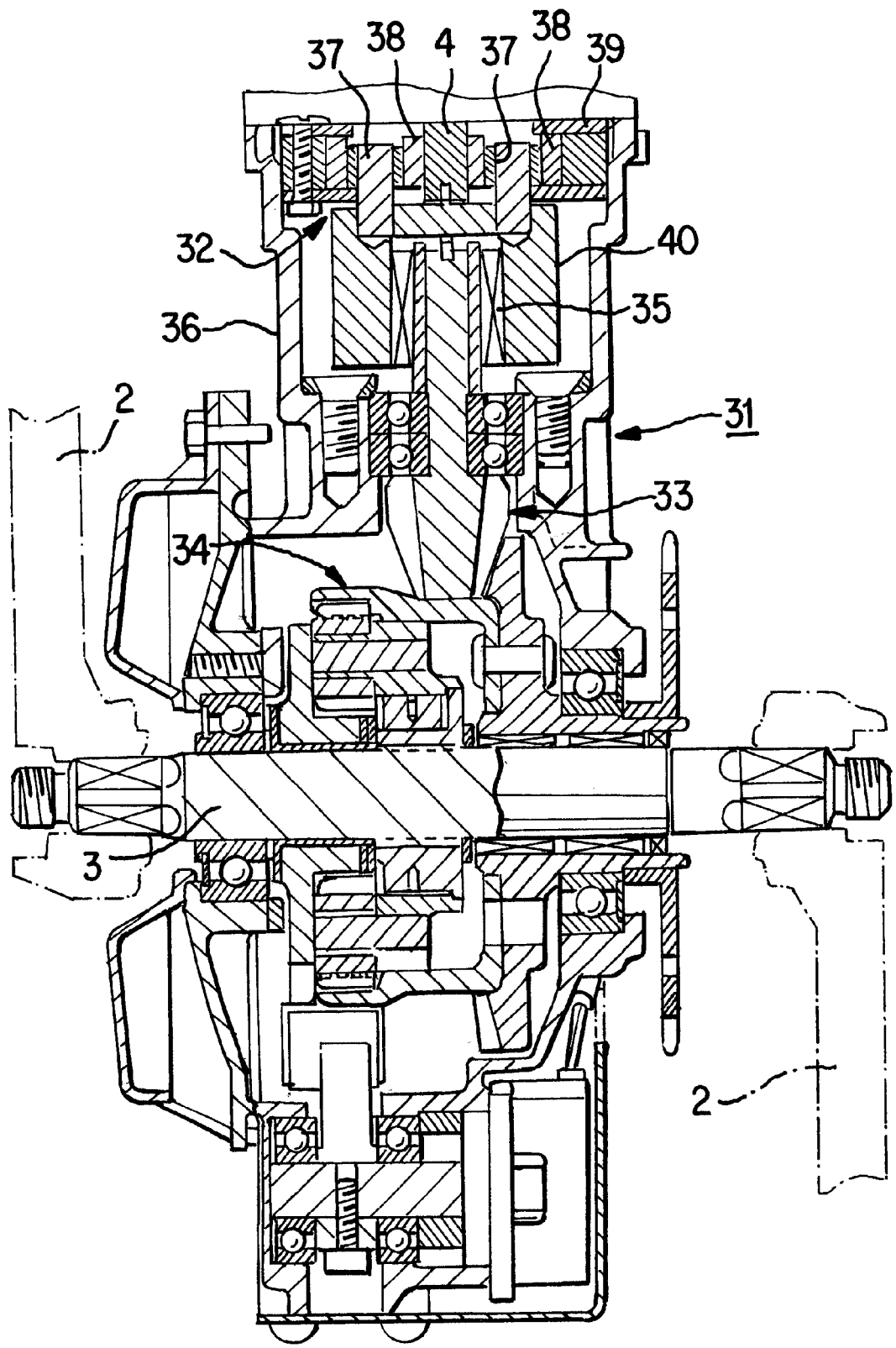
FIG. 1 is a diagrammatic cross sectional view of a conventional structure of the auxiliary equipment of driving force for bicycle.

The auxiliary equipment of driving force for bicycle of the present invention comprises, as in the auxiliary equipment of driving force for bicycle as disclosed in Japanese Patent First Publication Toku Kai Hei7-95744, a pedal shaft which is rotatingly driven through a pair of cranks by pedaling a pair of pedals of the bicycle to produce a torque, a battery and an electric motor to rotate its rotatable shaft in a determined direction based on the power from the battery, and a reduction gear apparatus provided between the rotatable shaft of the motor and the pedal shaft, such that the driving force having a magnitude corresponding to the torque applied through the pedals is applied to the pedal shaft together with the torque through the pedals.

The reduction gear apparatus includes a reduction gear of the traction roller type which is different from the reduction gear of the planetary roller type installed in the auxiliary equipment of driving force for bicycle as described in Japanese Patent First Publication Toku Kai Hei7-95744, and comprises a housing fixed to cover the end of the rotatable shaft of the motor, a plurality of (desirably three or more) pivot shafts or support shafts provided around the rotatable shaft within the housing and in parallel with the rotatable shaft, such that the pivot shafts or support shafts do not spin around the rotatable shaft, a plurality of (desirably three or more) intermediate rollers or traction rollers rotatably supported by the pivot shafts or support shafts, respectively, an outer ring provided within the housing to surround the intermediate rollers or traction rollers, such that at least the inner peripheral surface thereof is formed in a cylindrical surface, and an output shaft provided concentric with the outer ring and having one end securely fixed to the outer ring and rotatably supported by the housing. The outer peripheral surface of each of the intermediate rollers or traction rollers is abutted to the outer peripheral surface of the portion rotating together with the rotatable shaft and to the inner peripheral surface of the outer ring.

In particular, in the auxiliary equipment of driving force for bicycle of the present invention, the center of the rotatable shaft is eccentric with respect to the output shaft and to the center of the outer ring, so that an annular internal space existing to accommodate the intermediate rollers or traction rollers between the outer peripheral surface of the portion rotating together with the rotatable shaft and the inner peripheral surface of the outer ring, has a width size which is not uniform in the circumferential direction. In addition, at least one of the intermediate rollers or traction rollers is used as a wedge roller which is supported to be slightly displaced at least in the circumferential direction within the annular internal space and the other intermediate rollers or traction rollers are used as guide rollers. When the rotatable shaft and the outer ring are rotated in a predetermined direction, the at least one of the intermediate rollers or traction rollers used as in the annular internal space.

With the auxiliary equipment of driving force for bicycle of the present invention, the rotation of the rotatable shaft of the motor is transmitted to the intermediate rollers or traction rollers through the contact portions on the inner diameter side between the outer peripheral surface of the portion rotating with the rotatable shaft and the outer peripheral surfaces of the intermediate rollers or traction rollers. In addition, the rotation of the intermediate rollers or traction rollers is transmitted to the outer ring through the contact portions on the outer diameter side between the outer peripheral surfaces of the intermediate rollers or traction rollers and the inner peripheral surface of the outer ring. Thus, the output shaft securely fixed to the outer ring is rotated to apply auxiliary torque to the pedal shaft.

The pedal shaft is provided with torque through pedaling, and as the motor is turned on, the rotatable shaft and the outer ring rotate in the predetermined direction, and then the at least one intermediate roller or traction roller moves as a wedge roller toward the portion with a narrow width in the annular internal space between the outer peripheral surface of the rotatable shaft and the inner peripheral surface of the outer ring.

As a result, the outer peripheral surface of the at least one intermediate roller or traction roller as the wedge roller is urged to strongly push the outer peripheral surface of the rotatable shaft and the inner peripheral surface of the outer ring, so that at the contact portion on the inner diameter side between the outer peripheral surface of the rotatable shaft and the outer peripheral surface of the wedge roller and at the contact portion on the outer diameter side between the outer peripheral surface of the wedge roller and the inner peripheral surface of the outer ring, the contact pressure becomes high.

The contact pressure is high at these contact portions on the inner and outer diameter sides, and at least one of the rotatable shaft and the outer ring is slightly displaced in their diametrical direction, so that at the contact portions on the inner diameter side between the outer peripheral surface of the rotatable shaft and the outer peripheral surfaces of the other intermediate rollers or traction rollers i.e. guide rollers, and at the contact portions on the outer diameter side between the outer peripheral surfaces of these guide rollers and the inner peripheral surface of the outer ring, the contact pressure becomes high.

The force for causing the wedge roller to move toward the portion with a narrow width in the annular internal space changes corresponding to the magnitude of the torque transmitted to the outer ring from the rotatable shaft. Specifically, the larger the torque, the larger that force and the larger the contact pressure at the outer and inner diameter sides. On the contrary, if the torque is small, the contact pressure at the contact portions on the outer and inner diameter sides is small.

In the auxiliary equipment of driving force for bicycle of the present invention, when the torque transmitted through the reduction gear of the traction roller type is small, the contact pressure can be made small at the contact portions while when this torque is large, the contact pressure can be made large at the contact portions. Accordingly, even when the torque to be transmitted is large, the contact portions are efficiently prevented from slipping while when the torque to be transmitted is small, the rolling resistance acting on the contact portions can be kept small. As a result, the transmission efficiency of the reduction gear of the traction roller type is made high throughout the range, and the battery for providing. the motor with electric power is prevented from being exhausted, so that the traveling distance of the electrically power augmented bicycle is longer.

It should be noted here that the guide rollers require a play for bearing clearance due to the following reasons.

In order to produce an internally balanced load in the three rollers, the following actions are necessary. (1) the wedge roller moves into the narrow internal space portion;

(2) the input shaft is displaced by the wedge roller, so that the guide rollers come into contact with the outer ring.

(3) if there is no play in the guide rollers, the guide rollers would not come into contact with the outer ring in some cases.

In the case of two wedge rollers and a single guide roller, the relationship between the input shaft support bearing clearance $\delta_1$, guide roller support bearing clearance $\delta_2$ and outer ring support bearing clearance $\delta_3$ is $\delta_2 < \delta_2 < \delta_1$ so as to prevent any slip between them, wherein the optimum values of a $\delta_1$ and $\delta_2$ is 25 $\mu$m to 100 $\mu$.

In-addition, the internal space must be provided with grease. The amount of grease filled in is for example 4 g which is up to 10% of the internal space in volume.

Traction oil having a viscosity of 20 to 100 cst/40° C., 2 to 10 cst/100° C. can be used.

Traction grease having a consistency from about 350 to about 400 can be used.

Now the present invention is further detailed in the following examples of the embodiments referring to the drawings attached.

Figure 2:
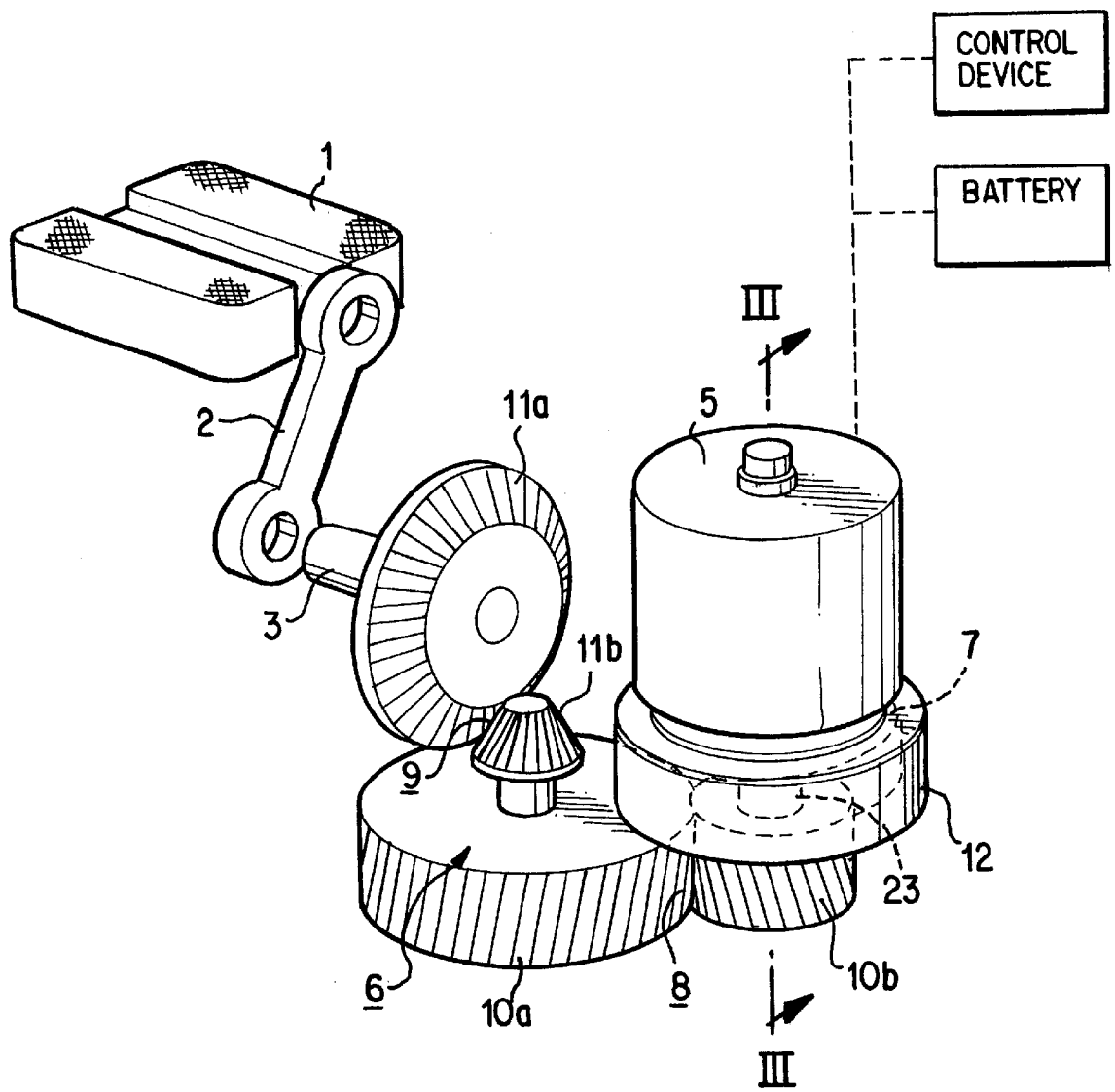
FIG. 2 is a diagrammatic perspective view of a first example of the embodiments in the present invention.
Figure 3:
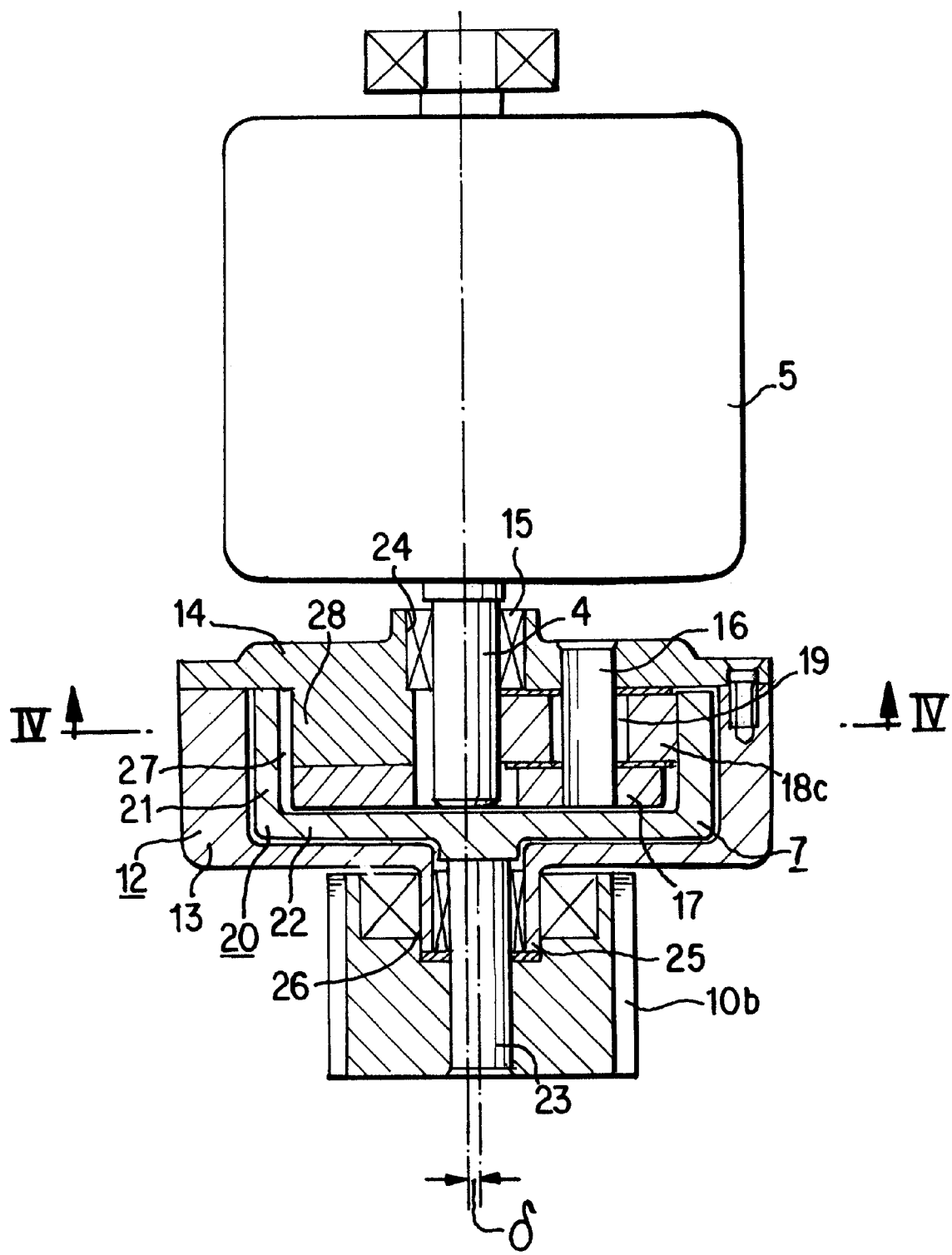
FIG. 3 is a partial cross sectional view taken along the. line III—III of FIG. 2.
Figure 4:
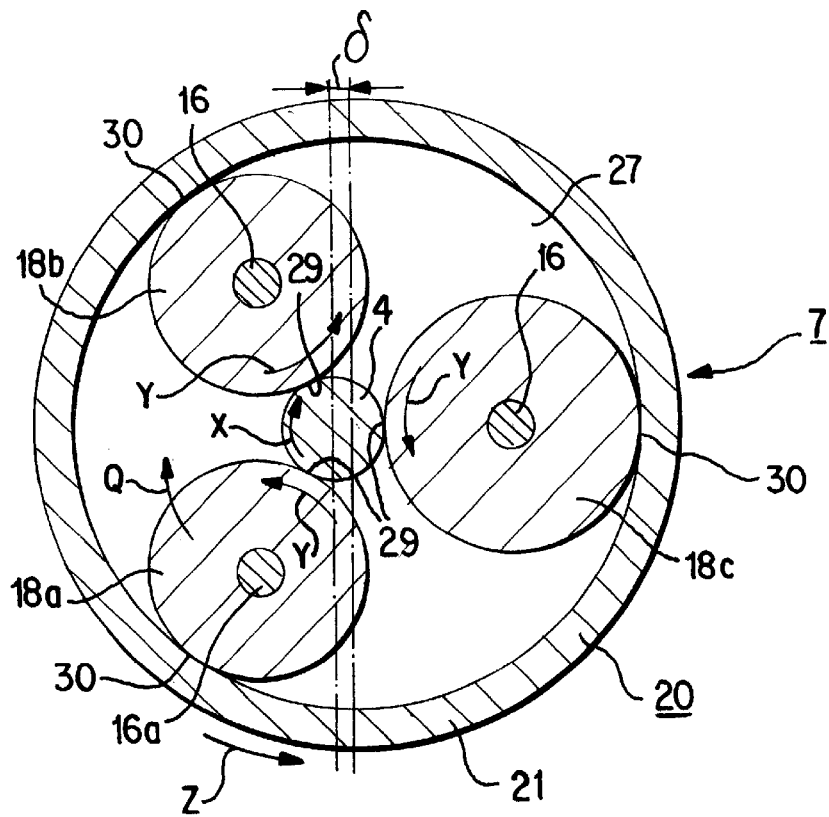
FIG. 4 is a cross sectional view taken along the line IV—IV of FIG. 3 part of which is omitted.

FIGS. 2 to 4 illustrate a first example of the embodiments of the present invention.

The auxiliary equipment of driving force for bicycle of the present invention is characterized in that the contact pressure at the contact portions is changed corresponding to the torque of the rotating driving force transmitted through the reduction gear of the traction roller type, the transmission efficiency of the reduction gear of the traction roller type is kept high regardless of varying torque in the rotating driving force. Therefore, the following description is made basically about the structure and function of the portions of the reduction gear of the traction roller type.

The auxiliary equipment of driving force for bicycle of the present invention, as briefly shown in FIG. 2, comprises a pedal shaft 3 which is rotatingly driven with a torque through a pair of cranks 2 (only one illustrated) by pedaling a pair of pedals 1 (only one illustrated) of the bicycle (not shown). With the auxiliary equipment of driving force of the present invention, a driving force having a magnitude corresponding to the torque applied through the pedals 1 is added to the torque through the pedals 1. For this, the auxiliary equipment of driving force for bicycle of the present invention is equipped with a battery (not shown) and an electric motor 5 having a rotatable shaft 4 which is rotated in a determined direction based on electric power from the battery, and a reduction gear apparatus 6 provided between the rotatable shaft 4 of the motor 5 and the pedal shaft 3.

The reduction gear apparatus 6 is provided at its first stage with a reduction gear of the traction roller type 7 and at its intermediate and final stages with reduction gears 8, 9 using gears, which are arranged in series in the direction of power transmission. The reduction gear 8 at the intermediate stage comprises two helical gears 10a, 10b, larger and smaller ones, in an interlocking relationship with each other. The reduction gear 9 at the final stage comprises two bevel gears 11a, 11b, larger and smaller ones, in an interlocking relationship with each other. Incidentally, taking installation space etc. into consideration, the reduction gears 8, 9, at the intermediate and final stages can be selected from the group of planetary gear type, belt type, and another types conventionally known in the art.

The reduction gear of the traction roller type 7 characterizing the present invention comprises a housing 12 fixed to the frame etc. (not shown) to cover the end portion of the rotatable shaft 4 of the motor 5, and the housing 12 comprises a main body 13 in a bottomed cylindrical shape and a cover 14 to close the opening at the bass end portion of the main body 13.

The rotatable shaft 4 of the motor 5 has a tip end portion which is extended through the through hole 24 formed in a substantially central portion of the cover 14 and inserted into housing 2. The through hole 24 is placed at a position slightly separated from the center of the cover 14. In addition, a bearing 15 is provided between the inner peripheral surface of the through hole 24 and the outer peripheral surface of the rotatable shaft 4 at the intermediate portion thereof.

Provided around the rotatable shaft 4 within the housing 3 are three support shafts 16, 16a which are arranged in parallel with the rotatable shaft 4. Specifically, the support shafts 16, 16a have one end portion (upper end portion in FIG. 3) supported by the cover 14 and the other end portion (lower end portion in FIG. 3) supported by the connecting ring 17.

With the three support shafts 16, 16 two support shafts 16 have the opposite end portions securely fitted into or inserted without play into the fitting hole provided in the cover 14 and the connecting ring 17, respectively. Accordingly, the two support shafts 16 are never displaced in the circumferential and diametrical directions within the housing 12.

On the other hand, the remaining support shaft 16a is supported such that the opposite end portions of the support shaft 16a can be slightly displaced in the circumferential direction and, if required, in the diametrical direction within the housing 12 with reference to the cover 14 and the connecting ring 17.

Accordingly, in a portion of the cover 14 and the connecting ring 17 in alignment with the opposite end portions of the support shaft 16a, engagement grooves having a long arcuate shape and extending in the circumferential direction of the housing 12 or support holes (not shown in FIGS. 2 to 4) having a larger inner diameter than the outer diameter of the opposite end portions of the support shaft 16a are formed, such that the opposite end portions of the support shaft 16a is loosely engaged with the engagement grooves or support holes, respectively. Rotatably supported around the intermediate portion of the support shafts 16, 16a through the bearing 19 (look at FIG. 3, not shown in FIG. 4) are a wedge roller 18a and guide rollers 18b, 18c which are traction rollers, respectively.

A projection 28 is provided at a location displaced from the wedge roller 18a and guide rollers 18b, 18c on a portion of the inner surface (the lower surface in FIG. 3) of the cover 14 and projected in the space where the wedge roller 18a and guide rollers 18b, 18c are set. A portion of the connecting ring 17 is connected to the projection 28.

Rotatably provided within the housing 12 and at a portion surrounding the wedge roller 18a and guide rollers 18b, 18c is an outer ring 20 in a bottomed cylindrical shape which comprises a cylindrical portion 21 and a disc portion 22 to close the opening at one end (lower end in FIG. 3) of the cylindrical portion 21. The inner peripheral surface of the cylindrical portion 21 is formed in a smooth cylindrical surface and can come into contact with the outer peripheral surface of the wedge roller 18a and guide rollers 18b, 18c which are also made smooth.

An output shaft 23 is securely connected at its base end portion (upper end portion in FIG. 3) to the outside surface of the disc portion 22 (lower surface in FIG. 3), that is to the surface on the side opposed to the space where the wedge roller 18a and guide rollers 18b, lgc are set.

Provided in the central portion of the main body 13 of the housing 12 is a second through hole 25 through which the output shaft 23 extends and projects out of the housing 12.

Provided between an outer peripheral surface portion of the output shaft 23 closer to the base end thereof and the inner peripheral surface of the second through hole 25 is a bearing 26 by which the outer ring 20 and the output shaft 23 are rotatably supported with respect to the housing 12.

The output shaft 23 has a tip end portion (lower half portion in FIG. 3) projecting out of the housing 12, to which the smaller helical gear 10b of the reduction gear 8 is fixed.

The outer peripheral surface of the wedge roller 18a and guide rollers 18b, 18c is abutted to the outer peripheral surface of the rotatable shaft 4 and to the inner peripheral surface of the outer ring 20. Particularly, in the auxiliary equipment of driving force for bicycle of the present invention, the center of the rotatable shaft 4 is eccentric with reference to the center of the output shaft 23 and outer ring 20.

Specifically, the through hole 24 for inserting the rotatable shaft 4 is located at a location slightly separated from the center of the housing 12 while the second through hole 25 for inserting the output shaft 23 is located at the center of the housing 12. In addition, the output shaft 23 supported within the second through hole 25 is concentric with the outer ring 20. Accordingly, the rotatable shaft 4 is eccentric with reference to the outer ring 20 and output shaft 23 by an amount δ which is a displacement amount of the through hole 24 from the center of the housing 12. And, the width size of the internal space 27 between the outer peripheral surface of the rotatable shaft 4 and the inner peripheral surface of the outer ring 20 where the wedge roller 18a and guide rollers 18b, 18c are provided, is not uniform in the circumferential direction by an amount corresponding to the eccentric amount δ.

The outer diameters of the wedge roller 18a and guide roller 18b are different from the outer diameter of the guide roller 18c corresponding to the feet that the width size of the inner space 27 is not uniform in the circumferential direction. Specifically, the wedge roller 18a and the guide roller (smaller guide roller) 18b are located on the side (left side in FIG. 4) where the center of the rotatable shaft 4 eccentric with reference to the outer ring 20 is located, and have the same, relatively smaller, diameter. On the other hand, the guide roller (larger guide roller) 18c is located on the other side (right side in FIG. 4) opposite to the side where the center of the rotatable shaft 4 is located, and has a diameter relatively larger than the diameter of the wedge roller 18a and the guide roller 18b.

The outer peripheral surfaces of the three traction rollers, that is the wedge roller 18a and guide rollers 18b, 18c are abutted to the outer peripheral surface of the rotatable shaft 4 and to the inner peripheral surface of the outer ring 20, respectively.

Incidentally, the reduction ratio of the reduction gear of the traction roller type 7 is determined by the ratio of the outer diameter of the rotatable shaft 4 to the inner di*meter of the outer ring 20. Accordingly, in order to obtain a necessary reduction ratio, a sleeve may be fitted onto the tip end portion of the rotatable shaft 4, so that the outer peripheral surface of the sleeve is abutted to the outer peripheral surfaces of the wedge roller 18a and guide rollers 18b, 18c.

The support shafts 16 for supporting the guide rollers 18b, 18c are fixed into the housing 12 while the support shaft 16a for supporting the wedge roller 18a is supported in the housing 12 to be slightly displaceable in the circumferential direction as mentioned above. Accordingly, the wedge roller 18a is also slightly displaceable in the circumferential direction within the housing 12. And, when the rotatable shaft 4 is rotated in the predetermined direction, the wedge roller 18a rotatably supported by the single support shaft 16a can be moved toward a portion of the internal space 27 where the width in narrow.

Specifically, in the illustrated example, the direction in which the components are assembled is controlled such that the rotatable shaft 4 is rotated in the clockwise direction as indicated by the arrow X in FIG. 4 when an auxiliary power is applied to the pedal shaft 3. Accordingly, during the application of the auxiliary power, the wedge roller 18a and guide rollers 18b, 18c are rotated in the counterclockwise direction around the support shafts 16a, 16 as indicated by the arrow Y in FIG. 4, and the outer ring 20 is rotated also in the counterclockwise direction as indicated by the arrow Z in FIG. 4.

Thus, the single wedge roller 18a is rotated in the counterclockwise direction as indicated by the arrow Y in FIG. 4, and the rotatable shaft 4 and the outer ring 20 supporting the wedge roller 18a from the opposite sides, specifically from the radially inner and outer sides with reference to the housing 12 are rotated as indicated by the arrows X and Z, so that the whole wedge roller 18a is inclined to be displaced in the clockwise direction in FIG. 4 as indicated by Q.

Specifically, the wedge roller 18a receives a force in the direction as indicted by the arrow Q from the rotatable shaft 4 rotating in the direction as indicated by the arrow X, and receives a force in the direction as indicated by Q due to the reaction exerted from the contact portion between the wedge roller 18a and the inner peripheral surface of the outer ring 20 because the wedge roller 18a is rotated in the direction as indicated by the arrow Y. As a result, during rotation of the rotatable shaft 4, the wedge roller 18a is inclined to move toward the portion of the internal space 27 where the width is narrow.

In the auxiliary equipment of driving force for bicycle of the present invention constructed as mentioned above, the rotation of the rotatable shaft 4 of the motor 5 is transmitted to the wedge roller 18a and guide rollers 18b, 18c through the respective contact portions 29 on the inner diameter side between the outer peripheral surface of the rotatable shaft 4 and the outer peripheral surface of the traction rollers, that is the wedge roller 18a and guide rollers 18b, 18c. Further, the rotation of the wedge roller 18a and guide rollers 18b, 18c is transmitted to the outer ring 20 through the respective contact portions 30 on the outer diameter side between the inner peripheral surface of the outer ring 20 and the outer peripheral surface of the traction rollers that is the wedge roller 18a and guide rollers 18b, 18c. The rotation of the output shaft 23 is transmitted to the pedal shaft 3 through the pair of the reduction gears 8, 9 to apply auxiliary power to the pedal shaft 3.

As the rotatable shaft 4 and the outer ring 20 rotate in the predetermined direction, the wedge roller 18a rotatably supported by the single support shaft 16a moves toward the portion of the internal space 27 where the width is narrow, that is in the direction as Indicated by the arrow Q, within the internal space 27 existing between the outer peripheral surface of the rotatable shaft 4 and the inner peripheral surface of the outer ring 20. As a result, the wedge roller 18a rotatably supported by the single support shaft 16a strongly pushes at the outer peripheral surface thereof the outer peripheral surface of the rotatable shaft 4 and the inner peripheral surface of the outer ring 20. And, the contact pressure becomes high at the contact portion 29 on the inner diameter side between the outer peripheral surface of the rotatable shaft 4 and the outer peripheral surface of the wedge roller 18a, and at the contact portion 30 on the outer diameter side between the inner peripheral surface of the outer ring 20 and the outer peripheral surface of the wedge roller 18a.

As the contact pressure is increased at the contact portions 29, 30 on the inner and outer diameter sides with respect to the single wedge roller 18a, at least one of the rotatable shaft 4 and outer ring 20, which are pushed by the outer peripheral surface of the wedge roller 18a, is slightly displaced in a diametrical direction due to the installation clearance or elastic deformation etc. As a result, the contact pressure becomes high at the two contact portions 29 on the inner diameter side between the outer peripheral surface of the rotatable shaft 4 and the outer peripheral surface of the other two traction rollers, that is the guide rollers 18b, 18c, and at the two contact portions 30 on the outer diameter side between the inner peripheral surface of the outer ring 20 and the outer peripheral surface of the guide rollers 18b, 18c.

The wedge roller 18a which is rotatably supported by the single support shaft 16a, is caused to move toward the portion of the internal space 27 where the width is narrow, by the force changing corresponding to the magnitude of the torque transmitted from the rotatable shaft 4 to the outer ring 20. Specifically, as the torque applied to the pedal shaft 3 from the pedals 1 becomes large, and as the driving torque of the rotatable shaft 4 of the motor 5 becomes large based on the signals from the sensor having detected that torque, the force to make the wedge roller 18a move toward the portion of the internal space 27 where the width is narrow becomes large. And, as this force becomes large, the contact pressure at the contact portions on the inner and outer diameter sides 29, 30 becomes large. In other words, when the driving torque is small, the contact pressure at the contact portions on the inner and outer diameter sides 29, 30 is small.

According to the auxiliary equipment of driving force for bicycle of the present invention, when the torque transmitted through the reduction gear of the traction roller type 7 of the reduction gear apparatus 6 is small, the contact pressure at the contact portions 29, 30 is made small, while when this torque is large, the contact pressure at-the contact portions 29, 30 is made large.

Accordingly, even when the torque transmitted is large, the contact portions 29, 30 are efficiently prevented from slipping, while when the torque transmitted is small, the rolling resistance acted on the contact portions 29, 30 can be kept small.

Figure 5:
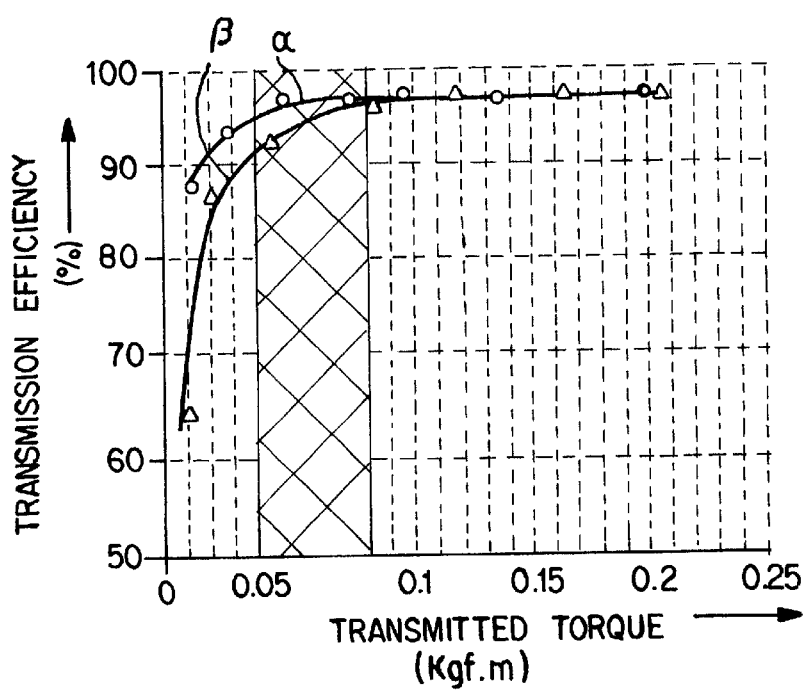
FIG. 5 is a diagram showing a difference between the transmission efficiency of a reduction gear of the traction roller type installed in the auxiliary equipment of driving force for bicycle of the present invention and the transmission efficiency of a reduction gear of the traction roller type used a in the prior art.

FIG. 5 shows the transmission efficiency of a reduction gear of the traction roller type in the torque range related to the auxiliary equipment of driving force for bicycle of the present invention, where the abscissa indicates the transmitted torque while the ordinate indicates the transmission efficiency, and the curve a with symbols ○ dotted in series indicates the transmission efficiency of the auxiliary equipment of driving force for bicycle of the present invention, the curve β with symbols Δ dotted in series indicates the transmission efficiency of the auxiliary equipment of driving force for bicycle which is not provided with the eccentric structure as in the present invention and is subjected to a strong contact pressure so as to produce no slip even in the maximum torque range, and the cross hatched area indicates a torque range normally used during the constant speed running on the flat land. As clear from FIG. 5, according to the auxiliary equipment of driving force for bicycle of the present invention, the transmission efficiency in the normally used torque range is improved in the order of 2 to 5 points(%), and by that amount, the traveling distance is extended.

In practice, as required, a return spring is added to the single support shaft 16a displaceable in the circumferential direction, so that a resilient force is applied to the single support shaft 16a in a direction to return to the neutral position, where the outer peripheral surface of the wedge roller 18a supported by the support shaft 16a is lightly contacted to the outer peripheral surface of the rotatable shaft 4 and to the inner peripheral surface of the outer ring 20.

The amount of eccentricity δ and the amount of displacement in the circumferential direction of the support shaft 16a are determined, as a design matter taking into consideration the contact pressure required for the contact portions 29, 30 during torque transmission.

In addition, with the reduction gear of the traction roller type installed in the auxiliary equipment of driving force for bicycle of the present invention, in the state where the rotatable shaft 4 is not rotated with the outer ring 20 rotated, as in inertia riding or downward slope riding, the wedge roller 18a is inclined to move toward the portion of the internal space 27 where the width is wide. As a result, the contact pressure becomes lower between the outer peripheral surface of the wedge roller 18a and guide rollers 18b, 18a and the outer peripheral surface of the rotatable shaft 4 and the inner peripheral surface of the outer ring 20, so that the rotation of the outer ring 20 is not transmitted to the rotatable shaft 4. Accordingly, in working the present invention, the one way clutch, required in the conventional structures, can be omitted.

Figure 6:
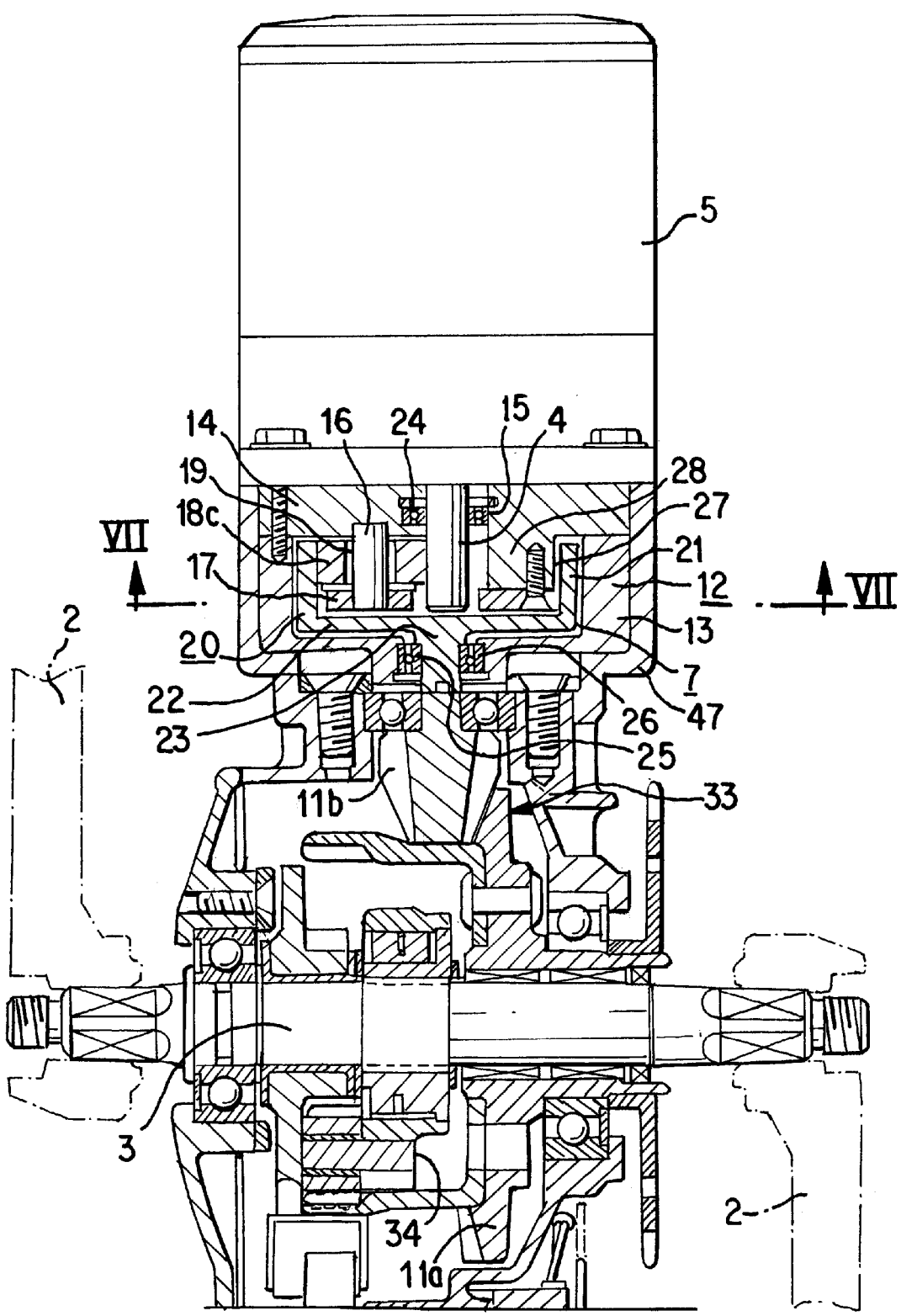
FIG. 6 is a partly cross sectional, side elevational view of a second example of the embodiments in the present invention.
Figure 7:
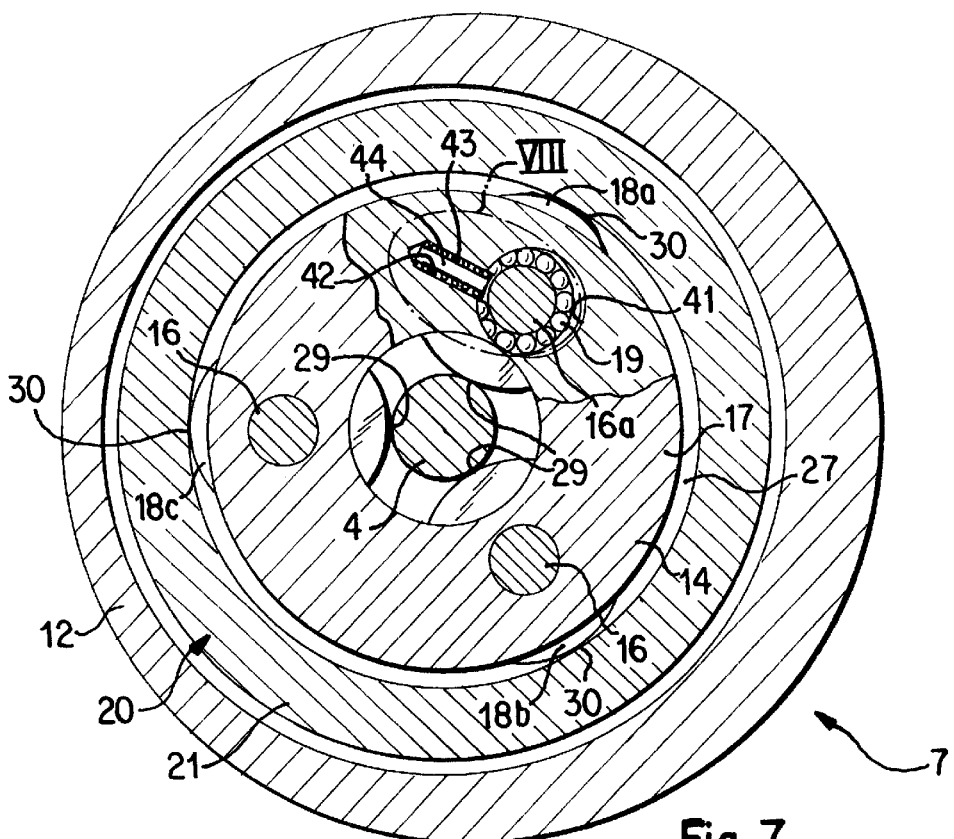
FIG. 7 is a cross sectional view taken along the line VII—VII of FIG. 6 with a portion omitted where the cross section is changed in position partly.
Figure 8:
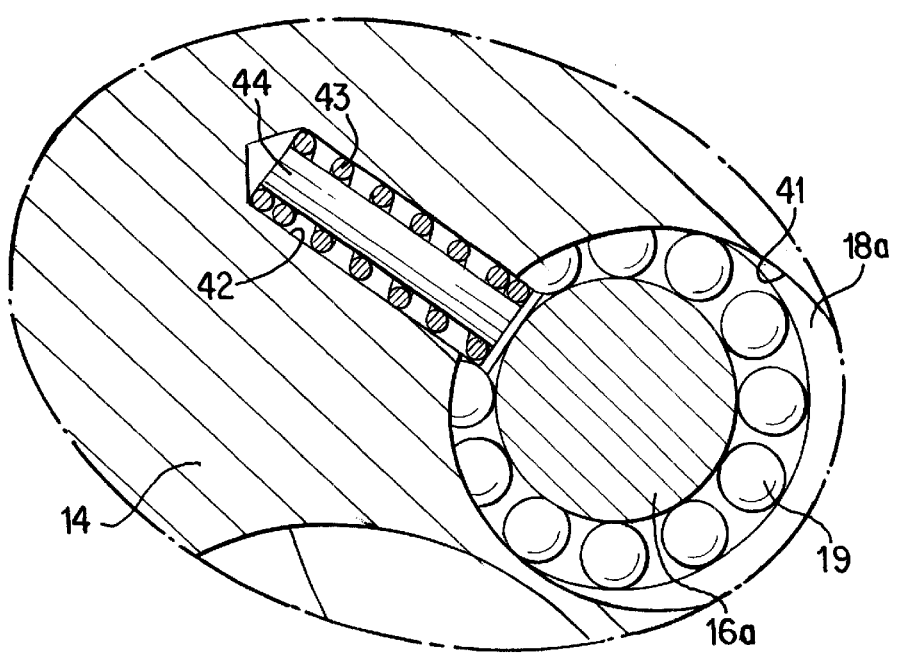
FIG. 8 is an enlarged view of Portion VIII in FIG. 7.

FIGS. 6 to 8 show a second example of the embodiments of the present invention, where the feature of the reduction gear of the traction roller type is utilized to omit the one way clutch.

In this example, three support shafts 16, 16a are extended between and supported by the inner surface (lower surface in FIG. 6) of the cover 14 of the housing 12 and the connecting ring 17. With the three support shafts 16, 16a, the two support shafts 16 are used to support the guide rollers 18b, 18c and fixed by fitting so as not to move with reference to the cover 14 and connecting ring 17. On the other hand, the support shaft 16a has an intermediate portion around which the wedge roller 18a is rotatably supported, and the opposite ends of the support shaft 16a are loosely engaged with the support holes 41, which are formed in the inner surface of the cover 14 and in the connecting ring 17 and have an inner diameter larger than the outer diameter of the support shaft 16.

One portion of the cover 14 is formed with a cylinder hole 42 having an opening in the inner peripheral surface of the support hole 41, The cylinder hole 42 is formed simultaneously when the cover 14 is formed through the step of die-casting aluminum etc. With the cylinder hole 42 formed, the axial dimension of the cover 14 is effectively utilized for easy design of the compact reduction gear of the traction roller type 7. Inserted into the cylinder hole 42 are a resilient member 43 having a small elasticity such as compression spring, and a push member 44 biased by the resilient member 43 in a direction to project from the inner peripheral surface of the support hole 41. The push member 44 at one end face thereof is resiliently abutted to the outer peripheral surface of the support shaft 16a supporting the wedge roller 18a. The support shaft 16a and the wedge roller 18a supported by the intermediate portion of the support shaft 16a are lightly pushed toward the narrow portion of the internal space 27 existing between the outer peripheral surface of the rotatable shaft 4 and the inner peripheral surface of the cylindrical portion 21 of the outer ring 20.

Incidentally, the push member 44 serves to prevent the resilient member 43 from failing to keep at an optimum value the resilient load applied to the support shaft 16a by the resilient member 43. Specifically, when the resilient member 43 is tilted within the cylinder hole 42, the direction of action in the resilient load of the resilient member 43 is displaced, so that the resilient load applied to the support shaft 16a can be out of the setting value. Accordingly, with the push member 44, the resilient member 43 is prevented from falling to keep at a setting value the resilient load applied to the support shaft 16a. Although omitted from the drawings, part of the support shaft 16a to which the tip end face of the push member 44 is abutted is formed with a flat surface, as required, to prevent the rotation of the support shaft 16a.

Securely connected to the outside surface of the central portion of the disc portion 22 of the outer ring 20 is the output shaft 23 at its base end portion, the rotating motion of which can be transmitted to the pedal shaft 3 through the reduction gear 33 of the bevel gear type at the intermediate stage and the reduction gear 34 of the planetary gear type at the final stage, which is similar to the conventional structure illustrated in FIG. 1.

In the case of the auxiliary equipment of driving force for bicycle in the present example, however, different from the conventional structure illustrated in FIG. 1, the one way clutch such as roller clutch as in FIG. 1 is not disposed between the reduction gear of the traction roller type 7 and the reduction gear 33 of the bevel gear type. Specifically, the output portion of the reduction gear of the traction roller type 7 and the input portion of the reduction gear 33 are connected to each other integrally or by way of recess and land engagement for transmission of rotating forces in the opposite directions.

In the auxiliary equipment of driving force for bicycle of the present example, although the one way clutch such as roller clutch is not disposed between the reduction gear of the traction roller type 7 and the reduction gear 33 of the bevel gear type, the pedal shaft 3 is mechanically separated from the rotatable shaft of the motor 5 in the state such as inertia riding or downward slope riding without pedaling, so that the existence of the motor 5 is prevented from being a resistance against traveling. Specifically, in the riding state where the pedals 1 are not operated without rotating the rotatable shaft 4 while rotating the outer ring 20, the wedge roller 18*a* is inclined to move against the elastic force of the resilient member 43 to the portion of the internal space 27 where the width is wide. As a result, the contact pressure becomes lower between the outer peripheral surface of the wedge roller 18*a* and guide rollers 18*b*, 18*c* and the outer peripheral surface of the rotatable shaft 4 and the inner peripheral surface of the outer ring 20, and slips are caused at the contact portions 29 on the inner diameter side and at the contact portions 30 on the outer diameter side so as not to transmit the rotation of the outer ring 20 to the rotatable shaft 4.

Since the one way clutch is not used, not only the cost reduction due to the parts cost reduction by that amount is achieved, but also the parts administration and assembling process become easy, leading also to a cost reduction. In addition, since there is no space requirement for the one way clutch, the auxiliary equipment of driving force for bicycle can be made small and light weighted. Incidentally, the resilient member 43 and the push member 44 for biasing the wedge roller 18*a* toward the narrow width portion in the internal space 27 are desirably provided between the opposite end portions of the support shaft 16*a* and the cover 14 and connecting ring 17, if the setting space allows it.

In this example and the following third example, the elastic force (resilient load) of the compression coil spring or the resilient member 43 to push the support shaft 16*a* supporting the wedge roller 18*a* toward the narrow width portion of the internal space 27 is determined as a design matter based on the magnitude of the rotating force (torque) to be transmitted to the outer ring 20 from the rotatable shaft 4. For example, in the case of the auxiliary equipment of driving force for bicycle usually used, the magnitude of the resilient load is desirably limited in the range of 150 g to 1,000 g. If the resilient load is less than 150 g, the contact pressure would be too small between the outer peripheral surface of the wedge roller 18*a* and the outer peripheral surface of the rotatable shaft 4 and the inner peripheral surface of the outer ring 20 in the state where the bicycle is stopped, so that a slip is caused between the outer peripheral surface of the wedge roller 18*a* and the outer peripheral surface of the rotatable shaft 4 and the inner peripheral surface of the outer ring 20, resulting in that sufficient auxiliary power is not secured. On the other hand, if the resilient load exceeds 1,000 g, the contact pressure would be too large, so that the rolling resistance is increased at the contact portions of the peripheral surface portions (at the contact portions 29 on the inner diameter side and at the contact portions 30 on the outer diameter side), resulting in not only that the transmission efficiency of the reduction gear 7 of the traction roller type is lowered, but also that the idling torque in the riding state where the pedals 1 are not operated, such as inertia riding or downward slope riding is increased, so that the rider feels uncomfortable, The resilient load of the resilient member 43 to the wedge roller 18*a* is necessary to secure the contact pressure between the outer peripheral surface of the wedge roller 18*a* and the outer peripheral surface of the rotatable shaft 4 and the inner peripheral surface of the outer ring 20 when the reduction gear of the traction roller type 7 starts, so that the contact portions 29 on the inner diameter side and the contact portions 30 on the outer diameter side, that is the contact portions between the peripheral surfaces are prevented from slipping. After the reduction gear of the traction roller type 7 has started, when the wedge roller 18*a* is wedged into the narrow width portion of the internal space 27, there should be no need of the elastic load of the resilient member 43, and if it is excessively large, the transmission efficiency of the reduction gear of the traction roller type 7 is lowered and the idling torque is increased. Accordingly, the magnitude of the resilient load is limited in the range of 150 g to 1,000 g.

Figure 9:
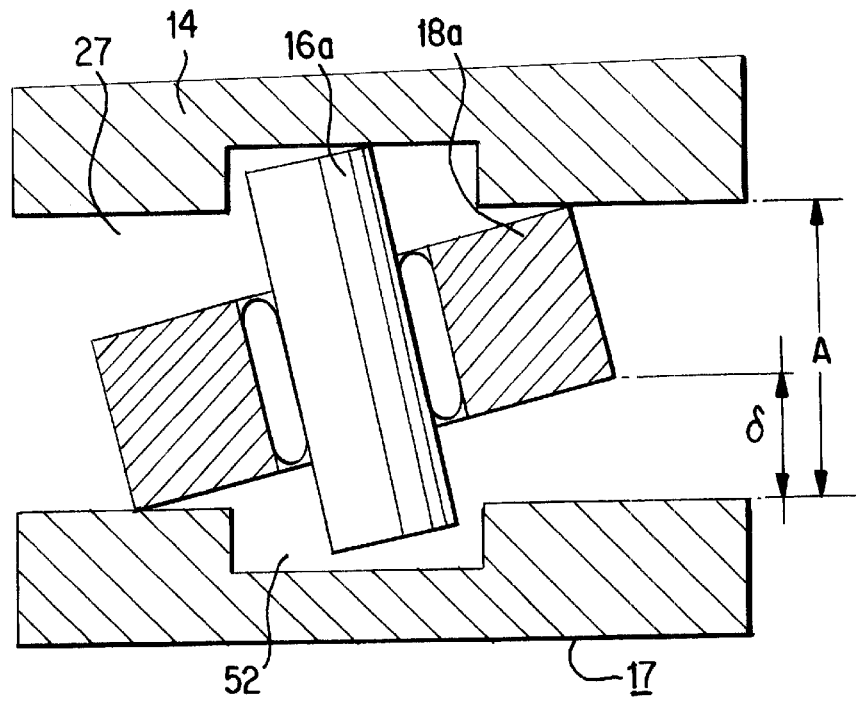
FIG. 9 is a diagrammatic cross sectional view of a tilted wedge roller.
Figure 10:
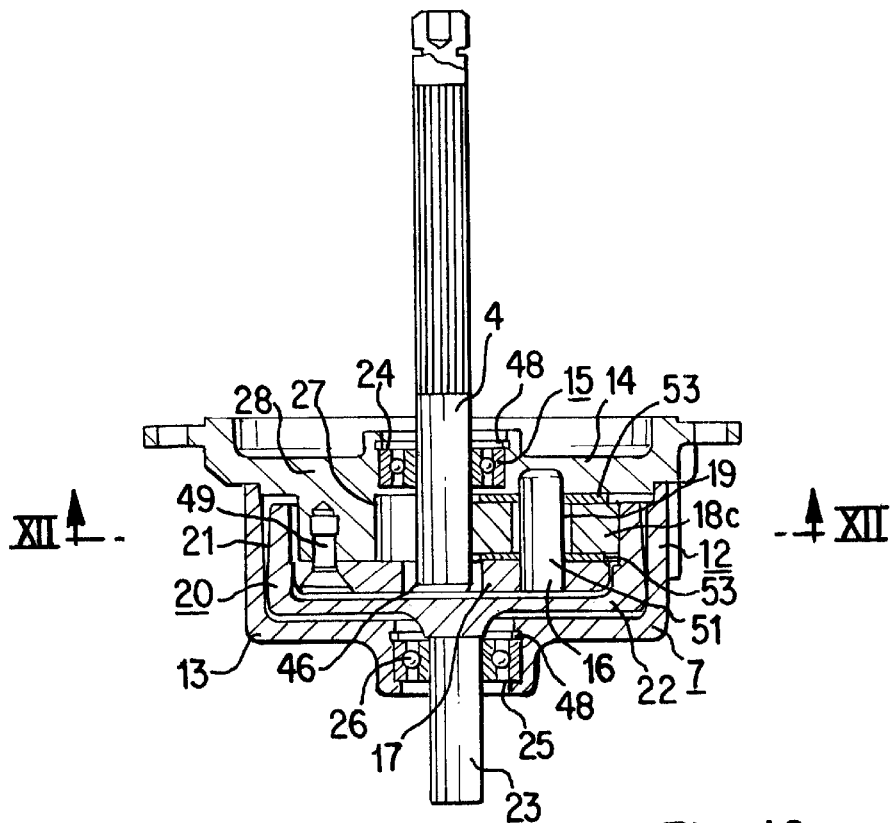
FIG. 10 is a partially cross sectional, side elevational view of a third example of the embodiments in the present invention.
Figure 11:
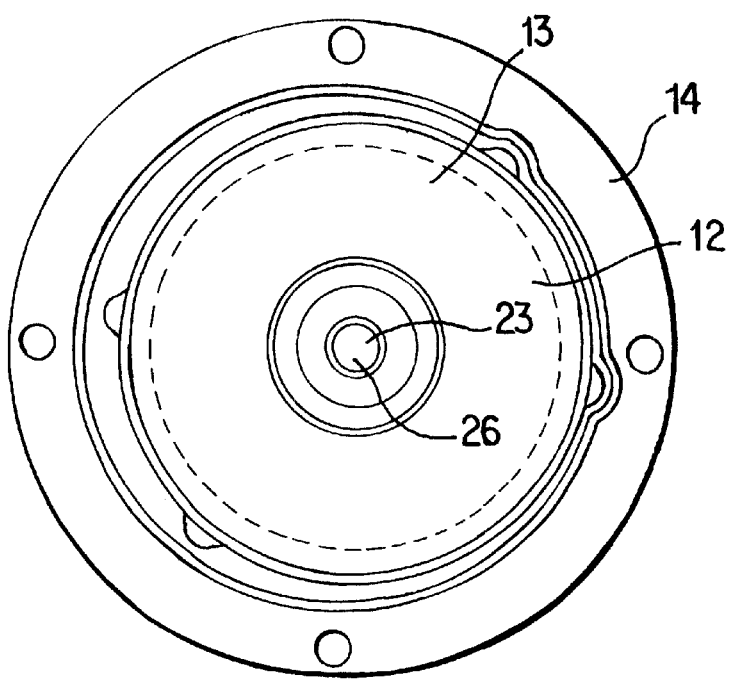
FIG. 11 is a bottom plan view of the example of FIG. 10.
Figure 12:
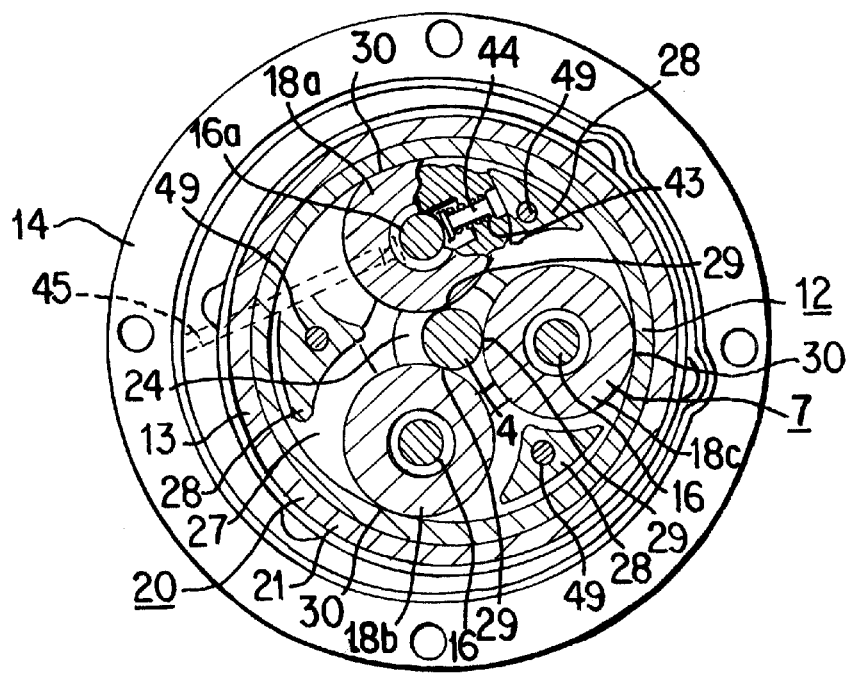
FIG. 12 is a cross sectional view taken along the line XII—XII of FIG. 10 with the cross section changed in position partly.

The axial clearance (A in FIG. 9) with respect to the wedge roller 18*a* installed in the internal space 27 is desirably controlled in the range of 0.1 mm to 1.5 mm. The reason is as follows, when the support shaft 16*a* supporting the wedge roller 18*a* is tilted with reference to the rotatable shaft 4 due to any cause (see FIG. 9), the inner surface of the internal space 27 and the peripheral edge of the wedge roller 18*a* would strongly rub each other, so that the wedge roller 18*a* is jammed. The situation can be prevented by the axial clearance, which is the distance δ between the outer peripheral edge of the end portion of the wedge roller 18*a* and the inside surface of the internal space 27 when it is displaced until it is no more tilted within the internal space 27.

FIGS. 10 to 14 show a third, more specific, example of the speed changers in the embodiments of the present invention, the basic structure of which is similar to those of the first and second examples in FIGS. 2 to 4 and FIGS. 6 to 8. The following are descriptions on the components of the present example, respectively.

The rotatable shaft 4, which is the rotating driving shaft of the motor 5 (look at FIGS. 2 and 3) and simultaneously the input shaft of the speed changer of the traction roller type 7, is subjected to induction hardening only at the tip portion (lower end portion in FIG. 10) which comes into contact with the outer peripheral surface of the wedge roller 18*a* and guide rollers 18*b*, 18*c*. Accordingly, the wear on the outer peripheral surface of the tip end portion of the rotatable shaft 4 is avoided, and the cost up due to the induction hardening and the deformation of the rotatable shaft 4 are minimized. In addition, the outer peripheral surface of the tip end portion of the rotatable shaft 4 subjected to the induction hardening process is ground to have a surface roughness up to 0.4a. Thus, by making smooth the outer peripheral surface of the tip portion of the rotatable shaft 4 in contact with the outer peripheral surface of the wedge roller 18*a* and guide rollers 18*b*, 18*c*, the oil film between the peripheral surfaces in contact with each other is protected, where the oil film formed has a large strength, whereby the traction drive is possible between the rotatable shaft 4 and the wedge roller 18a and guide rollers, 18c.

The installation of the rotatable shaft 4 into the reduction gear of the traction roller type 7 is carried out after the rotatable shaft 4 and the wedge roller 18a and guide rollers 18b, 18c are installed in the interior of the outer ring 20. In order to easily carry out the installation of the rotatable shaft 4 without any damages on the outer peripheral surfaces during the installation process, the wedge roller 18a is displaced toward the wide width portion in the internal space 27 upon inserting the rotatable shaft 4. Accordingly, in the illustrated example, part of the cover 14 (described later) opposed to the outer peripheral surface at the end portion of the support shaft 16a supporting the wedge roller 18a is formed with an insert hole 45 for inserting a rod shaped tool. Upon inserting the rotatable shaft 4, with the tool inserted into the insert hole 45, the support shaft 16a is moved toward the wide width portion against the elastic force of the compression coil spring, that is the resilient member 43, so that the diameter of the inscribing circle of the outer peripheral surfaces of the wedge roller 18a and guide rollers 18b, 18c is larger than the outer diameter of the tip end portion of the rotatable shaft 4. In addition, in the illustrated example, a chamfer 46 is formed on the outer peripheral edge at the tip end portion of the rotatable shaft 4 to make the inserting process of the rotatable shaft 4 easier. Consequently, the assembling of the reduction gear of the traction roller type 7 is made easy, and the cost reduction of the auxiliary equipment of driving force for bicycle including the reduction gear of the traction roller type 7 is achieved.

An intermediate portion of the rotatable shaft 4 closer to its tip end portion is supported by a clearance fitting inside the inner ring of the bearing 15. The outer ring of the bearing 15 is fitted into the through hole 24 formed in the cover 14 of the housing described later and prevented by a semicircular ring 48 from being pulled out of the through hole 24.

That the intermediate portion of the rotatable shaft 4 closer to its tip end portion is supported by a clearance fitting inside the inner ring of the bearing 15 is required not only to make easy the process of inserting the rotatable shaft 4, but also to securely operate the reduction gear of the traction roller type 7. Specifically, the edge roller 18a moves toward the narrow width portion of the internal space 27, the rotatable shaft 4 is displaced in a diametrical direction to increase the contact pressure at the contact portions 29 on the inner diametrical side between the outer peripheral surface of the rotatable shaft 4 and the outer peripheral surfaces of the rollers 18a, 18b, 18c and at the contact portions 30 on the diametrically outer side between the outer peripheral surfaces of the rollers 18a, 18b, 18c and the inner peripheral surface of the outer ring 20, wherein it is necessary that the clearance in the bearing 15 it limited in the range 0.010 mm to 0.2 mm taking into consideration the tolerance of the components, so that the rotatable shaft 4 is smoothly displaced in the diametrical direction and that the contact pressure at the contact portions 29, 30 is sufficiently increased.

Incidentally, the clearance in the bearing 15 is the sum of the internal clearance of the bearing 15, the clearance between the inner peripheral surface of the inner ring of the bearing 15 and the outer peripheral surface of the rotatable shaft 4, and the clearance between the outer peripheral surface of the bearing 15 and the inner peripheral surface of the cover 14 (described later).

The outer ring 20 of the reduction gear of the traction roller type 7 is made of a metallic material, such as carbon steel like SCr 420 having a sufficient rigidity and hardness and being relatively easy to process, and formed through forging. The metallic material after being formed in a predetermined shape through forging is subjected to heat treatment such as carbonizing quenching to harden the surface thereof, and then to the L3 treatment which is a grinding process after quenching.

Then, only part of the inner peripheral surface to be in contact with the outer peripheral surface of the wedge roller 18a and guide rollers 18b, 18c is ground for smooth finishing (up to 0.4a roughness) as in the outer peripheral surface of the tip end portion of the rotatable shaft 4. Thus, the outer ring 20 can be produced at a lower cost preventing its deformation.

In another way of forming, it is made of a carbon steel such as S53C having an intermediate amount of carbon, which is forged and lathe-cut in a predetermined shape and then subjected to induction quenching or laser quenching to harden the rolling surface only, and then only the rolling surface is ground. Incidentally, because the deformation is small in using the induction quenching or laser quenching, the grinding step can be omitted.

The base end portion (upper end portion in FIG. 10) of the output shaft 23 is securely connected to the outside surface (lower end portion in FIG. 10) of the disc portion 22 of the outer ring 20, and rotatably supported through the bearing 26 on the inside of the second through hole 25 formed in the main body 13 of the housing 12 described later.

The outer ring of the bearing 26 is fitted into the second through hole 25 and prevented from slipping out of the second through hole 25 with a stop ring 48 in a semicircular ring shape.

The output shaft 23 can be integrally formed with the outer ring 20 upon making it through forging, or securely mounted to the outer ring 20 after formed. When it is securely mounted to the outer ring 20 after formed, there may be a method such as that a mount hole is formed in the central portion of the outer ring 20, into which the bass end portion of the output shaft 23 is fitted by way of interference fitting. In any way, a rotating transmission member such as gear, pulley, is fitted onto the tip end portion (lower half portion in FIG. 10) of the output shaft 23 with press fitting, serration engagement, both of the press fitting and serration engagement or key engagement etc. Since the rotating transmission member is fitted onto the tip end portion of the output shaft 23, the installation space for the second stage reduction gear provided after the speed changer of the traction roller type 7 can be made small.

The main body 13 and the cover 14 of the housing 12 are made of a light alloy such as aluminum alloy, magnesium alloy etc. and formed through die casting. The main body 13 can be formed integrally with another member such as a casing 47 (see FIG. 6) etc. in which the reduction gear 33 of the bevel gear type, the reduction gear 34 of the planetary gear type, or another reduction gear is installed, Rotatably supported by this main body 13 through the bearing 26 as previously mentioned is the base end portion of the output shaft 23 which is connected to the outer ring 20. The cover 14 can be formed integrally with a component member of the motor 5 such as the end plate of the housing of the motor 5 (see FIG. 6). An intermediate portion of the rotatable shaft 4 closer to the tip end portion is rotatably supported by the cover 14.

Figure 13A:
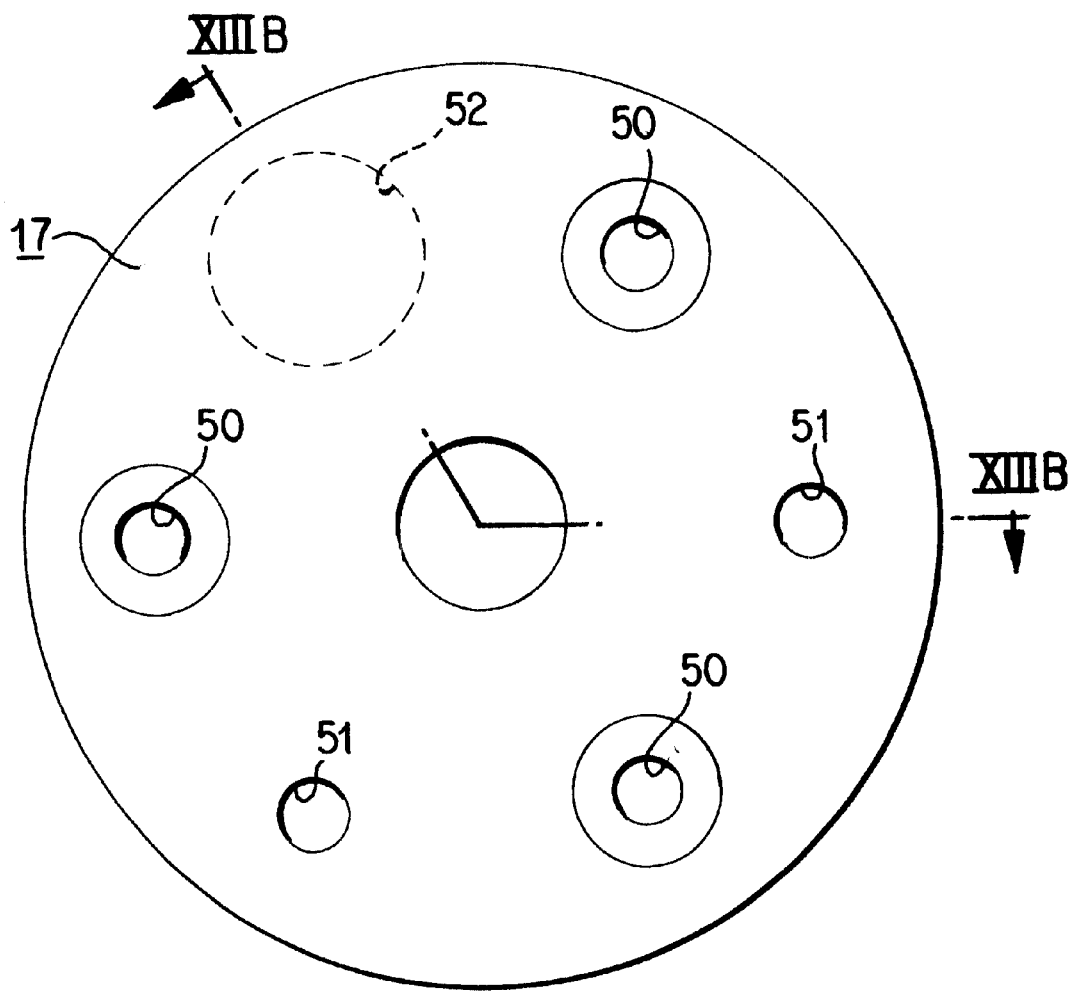
FIG. 13(A) is a bottom plan view of a connecting ring viewed from the lower side in FIG. 10.
Figure 13B:
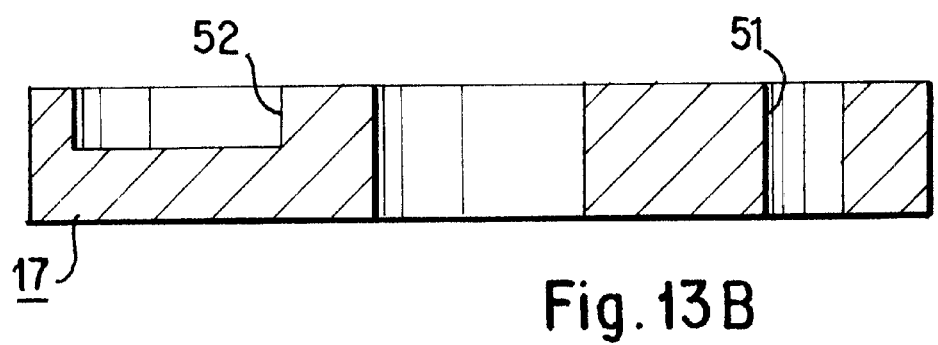
FIG. 13(B) is a cross sectional view taken along the line XIII—XIII of FIG. 13(A).

The support shafts 16a, 16 to support the outer peripheral surface of the wedge roller 18a and guide rollers 18b, 18c have one end portion (upper end portion in FIG. 10) thereof supported by the cover 14 and the other end portion (lower end portion in FIG. 10) connected to the connecting ring 17 which is made of a light alloy as mentioned above by way of die casting and formed in a shape as shown in FIGS. 13(A) and 13(B). Specifically, the connecting ring 17 is formed in a generally annular shape, and provided with three through holes 50 arranged in a circumferential direction into which a threaded screw 49 is inserted to securely fix the connecting ring 17 to the projections 28 of the cover 14. With the three mid portions existing between the circumferentially arranged through holes 50, a fitting hole 51 is formed in the two mid portions into which the other end portion of the support shafts 16 to support the guide rollers 18b and 18c is fitted by interference fitting or without play. On the other hand, the inside surface of the last one of the mid portions is formed with a bottomed support hole 52 having a diameter sufficiently larger than the support shaft 16a for loose engagement with the other end of the support shaft 16a to support the wedge roller 18a.

The connecting ring 17 can be made by way of cutting a steel plate, but desirably by way of die casting due to the holes therein, as mentioned above, for cost reduction.

The three support shafts 16, 16a are each subjected to the surface hardening heat treatment to secure a sufficient rolling fatigue life over the rolling contact with the rolling surface of the needle of the bearing 19 described later.

With the three support shafts 16, 16a, the support shafts 16 to support the guide rollers 18b, 18c can be fitted at the opposite end portions thereof in interference fitting into the fitting holes formed in the cover 14 and the connecting ring 17, respectively. However, from the assembling efficiency, only one end portion of the support shafts 16 is fitted into the cover 14 through interference fitting, and the other end of the support shafts 16 is fitted into the fitting holes 51 in the connecting ring 17 in a clearance fitting relationship. Specifically, the one end portion of the support shafts 16, 16a is supported by the cover 14 and then the wedge roller 18a and guide rollers 18b, 18c are fitted around the support shafts 16, 16a through the bearing 19 therebetween, and then the other end portion of the support shafts 16, 16a is supported in clearance fitting by the fitting holes 51 and support hole 52 formed in the connecting ring 17, whereby the assembling process is efficiently carried out.

Around the three support shafts 16, 16a extended between and supported by both of the cover 14 and the connecting ring 17, the wedge roller 18a and guide rollers 18b, 18c are rotatably supported by way of the bearing 19. In this example, a radial needle bearing with cage is used for the bearing 19, which holds needles with the cage in an inseparable manner, so that the operation to install the bearing 19 is efficiently carried out between the outer peripheral surface of the support shafts 16, 16a and the inner peripheral surface of the wedge roller 18a and guide rollers 18b, 18c.

The wedge roller 18a and guide rollers 18b, 18c rotatably supported around the support shafts 16, 16a are made of a hard metal with a sufficient hardness such as high carbon chromium bearing steel e.g. $SUJ_2$. The rollers 18a to 18c are subjected to the surface hardening heat treatment, and the outer peripheral surface thereof to be in contact with the inner peripheral surface of the outer ring 20 and the outer peripheral surface of the rotatable shaft 4 are ground, so that the outer peripheral surface of the rollers 18a to 18c are finished in a smooth surface having up to 0.4 a roughness as in the inner peripheral surface of the rotatable shaft 4 and outer ring 20. By finishing the outer peripheral surface of the rollers 18a to 18c in a smooth surface, the traction driving is possible between the rotatable shaft 4 and outer ring 20 and the wedge roller 18a and guide rollers 18b, 18c. Incidentally, the inner peripheral surface of the rollers 18a to 18c and the outer peripheral surface of the intermediate portion of the support shafts 16, 16a in contact with the rolling surfaces of the needles are finished in a smooth surface like the outer peripheral surface of the rollers 18a to 18c.

As clear from the description on the first and second examples, with the guide rollers 18b, 18c and the wedge roller 18a, the guide rollers 18b, 18c rotate around the support shafts 16 but never move circumferentially around the rotatable shaft 4. There is a clearance, however, in the bearings 19 provided between the inner peripheral surface of the guide rollers 18b, 18c and the outer peripheral surface of the support shafts 16, so that the guide rollers 18b, 18c can move slightly in a diametrical direction due to the displacement of the wedge roller 18a. The wedge roller 18a rotates around the support shafts 16a and slightly moves circumferentially around the rotatable shaft 4. Since the wedge roller 18a can be displaced due to the displacement of the support shaft 16a itself, the clearance is not necessarily provided in the bearing 19 between the inner peripheral surface of the wedge roller 18a and the outer peripheral surface of the support shaft 16a, but a clearance can be provided in the bearing 19 for common parts with respect to the guide rollers 18b, 18c and the support shafts 16 and for cost reduction.

Figure 14A:
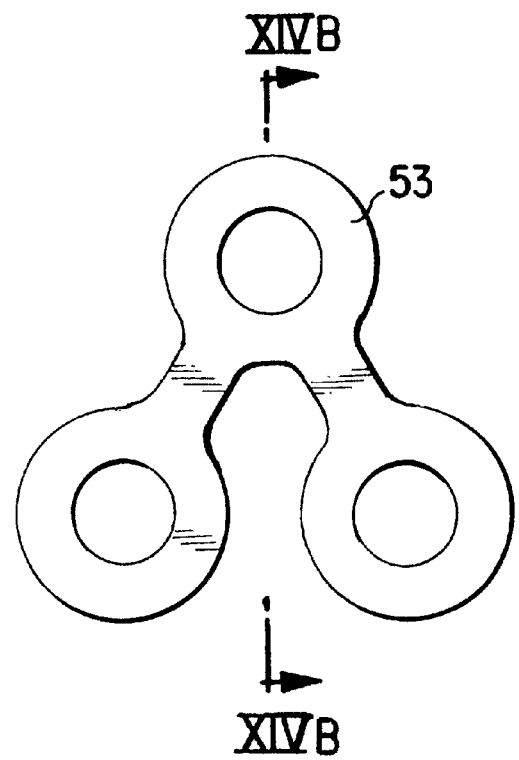
FIG. 14(A) is a view of a thrust washer viewed from the lower side in FIG. 10.
Figure 14B:
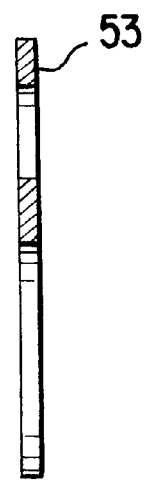
FIG. 14(B) is a cross sectional view taken along the line XIV—XIV of FIG. 14(A).

A thrust washer 53 is provided between the axially opposite end faces of the guide rollers 18b, 18a and the wedge roller 18a and the inside surfaces of the cover 14 and connecting ring 17 as shown in FIG. 14. With the thrust washers 53, the axially opposite end faces of the guide rollers 18b, 18c and the wedge roller 18a and the axially opposite end faces of the needles of the bearing 19, and the inside surfaces of the cover 14 and connecting ring 17 are prevented from rubbing each other for smooth rotation of the rollers 18a to 18c and for prevention of wear in the component members.

Incidentally, the thrust washers 53 can be formed to be independently used in each of the rollers 18a to 18c. In any shape, they can be made of a metallic plate by pressing, punching, or made of synthetic resin by injection molding. The synthetic resin having oil resistance and low friction will serve for cost reduction and long life.

Traction grease is filled in the housing 12 including the internal space 27. The traction grease is based on the traction oil to which a lithium soap group is added, and its traction coefficient is large, which makes it possible to transmit a large rotation force between the rotatable shaft 4 and the outer ring 20. Incidentally, the traction grease serves to lubricate the contact portions, too, Therefore, it is desirable to use for the traction grease having a high consistency e.g. about Uw387 to increase lubricating and flowing properties. However, when the consistency is increased for flowability, the traction grease can leak to the outside unless the seal member having a high performance is used to separate the inside of the housing 12 from the outside. Therefore, the consistency of the traction grease can be lowered in the range of 150 to 350 for balance with the performance of the sealing member.

With the traction grease in the order of 150 to 350 in consistency, the seal rings attached to the bearings 15, 26 can prevent the leakage of the traction grease in the degree causing no practical problem.

Incidentally, the traction oil can be used in lieu of the traction grease. In this case, due to reduction in resistance against stirring, the transmission efficiency may increase in the reduction gear of the traction roller type 7. On the other hand, the flowability of the traction oil is higher than the traction grease and easier in leaking, so that the performance of the sealing members must be improved the through portions of the rotatable shaft 4 and output shaft 23.

Figure 15A:
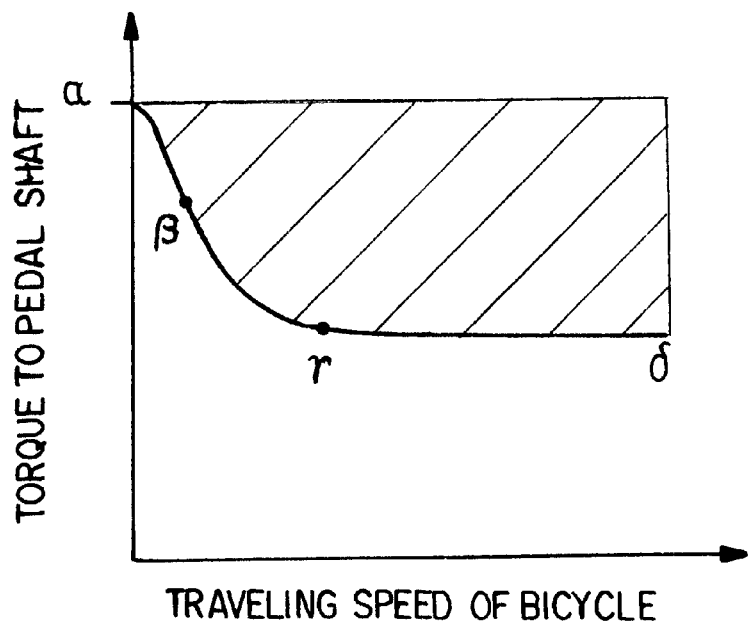
FIG. 15(A) is a graph showing a relationship between the traveling speed and the magnitude of auxiliary power.
Figure 15B:
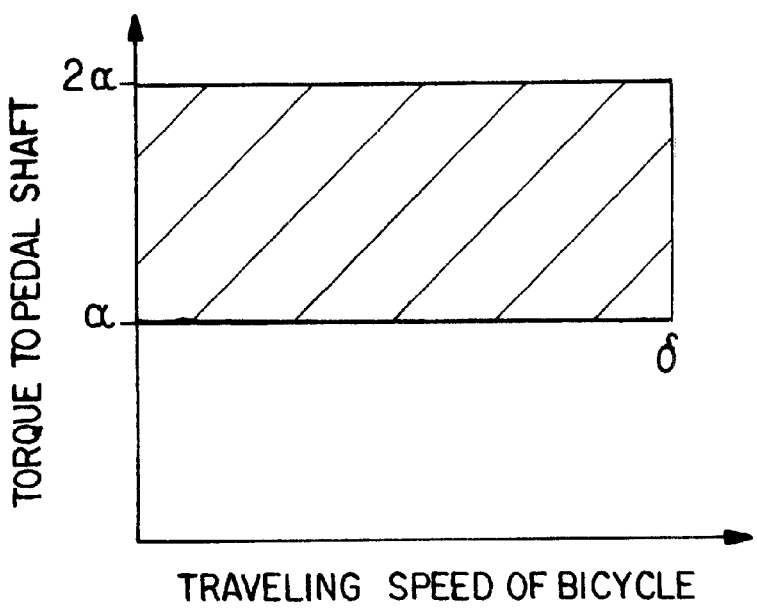
FIG. 15(B) is a graph showing another relationship between the traveling speed and the magnitude of auxiliary power.

Incidentally, during the time when the bicycle is halted, or traveling at a low speed, the conventional auxiliary equipment of driving force for bicycle Is controlled to take out from the motor 5. (see FIG. 2) as an auxiliary power a torque having the same magnitude as the one added to the pedal shaft 3 from the pedals 1. specifically, as shown in FIG. 15(A), as the torque of magnitude a is added to the pedal shaft 3 from the pedals 1, the motor 5 also produces the auxiliary power of magnitude a (hatched portion in FIG. 15(A)) so as to start the bicycle with the torque $2\alpha$. Under this control, one of the pedals is carelessly stepped on to start the bicycle, a large auxiliary power may be suddenly added to cause more or less a shock. In order to damp such a shock caused at the start, it will be considered as shown in FIG. 15(B) that the ratio of the auxiliary power added from the motor relative to the torque added to the pedal shaft 3 from the pedals 1 is made small at the start or Just after the start. Specifically, the bicycle is started substantially with the torque added to the pedal shaft 3 from the pedals 1, and as the speed of the bicycle is increased, the ratio of the auxiliary power added from the motor relative to the torque added to the pedal shaft 3 from the pedals 1 is increased, whereby the shock is prevented from being caused. For example, the following Tables 1 and 2 show examples of the control pattern as illustrated in FIG. 15(B).

TABLE 1

|   | α | β    | γ   |
|---|---|------|-----|
| 1 | 0 | 0.5  | 1   |
| 2 | 0 | 0.15 | 0.3 |
| 3 | 0 | 0.05 | 0.1 |

TABLE 2

|   | α       | β       |
|---|---------|---------|
| 1 | 3.5–5.3 | 1.5–2.0 |
| 2 | 3.5–5.3 | 0.5–0.7 |
| 3 | 2.2–3.3 | 1.5–2.0 |
| 4 | 2.2–3.3 | 0.5–0.7 |

Table 1 shows three speed patterns of the three points $\alpha$, $\beta$ and $\gamma$ indicated in FIG. 15(B), and Table 2 shows four torque the thus points $\alpha$ and $\beta$ indicated in FIG. 15(B). Table 1 is km/h, and the unit in Table 2 is kg·m. The control is carried out by appropriately combining the three patterns Table 1 and the four patterns in Table 2.

The bicycle can be provided with a change-over switch, so that the rider can select various control conditions including as shown in FIG. 15(A).

Incidentally, the value $\delta$ of torque in the state where the traveling speed is increased in a degree, is to be in the range of 0.8 $\gamma$ to 1.0 $\gamma$, and the value of $\beta$ is in the range of from $(\alpha+\gamma)/2$ to $(\alpha+\delta)/4$.

The speed at the portion of $\delta$ where the supply of the auxiliary power is stopped, is set in the order of from 20 km/h to 30 km/h.

The change in magnitude of the auxiliary power corresponding to the traveling speed of the bicycle can be achieved by controlling the amount of electric power supplied to the motor 5 or by changing the force to push the wedge roller 18a toward the narrow width portion in the internal space 27. In the latter case, however, the biasing force of the wedge roller 18a is produced by a resilient push means such as solenoid in which the biasing force can be controlled.

With the auxiliary equipment of driving force for bicycle constructed and functioning as mentioned above, the transmission efficiency is increased, the battery exhaustion is reduced, and the traveling distance of the electrically power augmented bicycle is prolonged, to which the realization of the electrically power augmented bicycle easier for use is attributed. In addition, as required, the one way clutch is omitted to provide a compact and light weighted bicycle at a lower cost.

Figure 16:
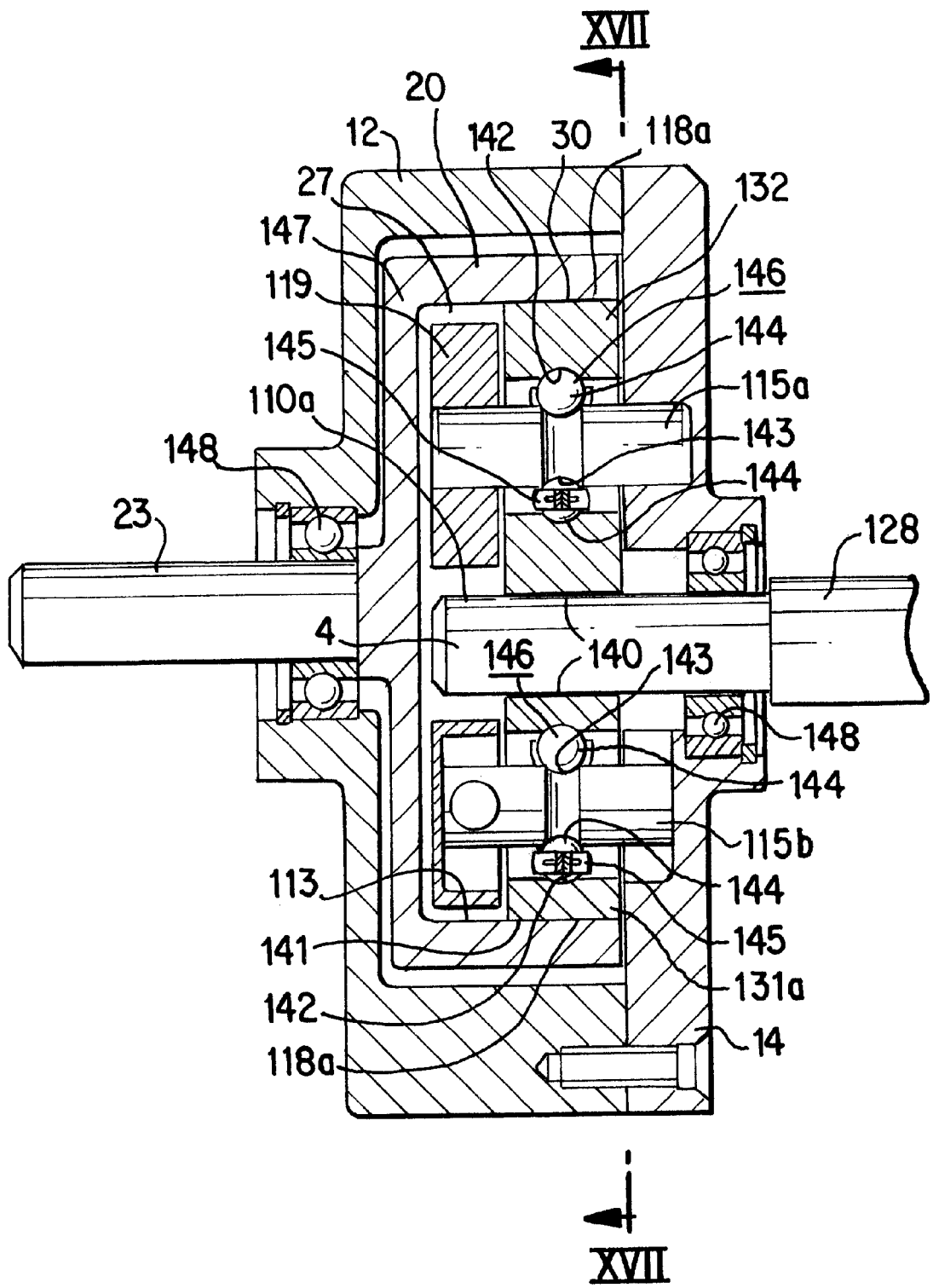
FIG. 16 is a diagrammatic cross sectional view of another example of the embodiments in the present invention.
Figure 17:
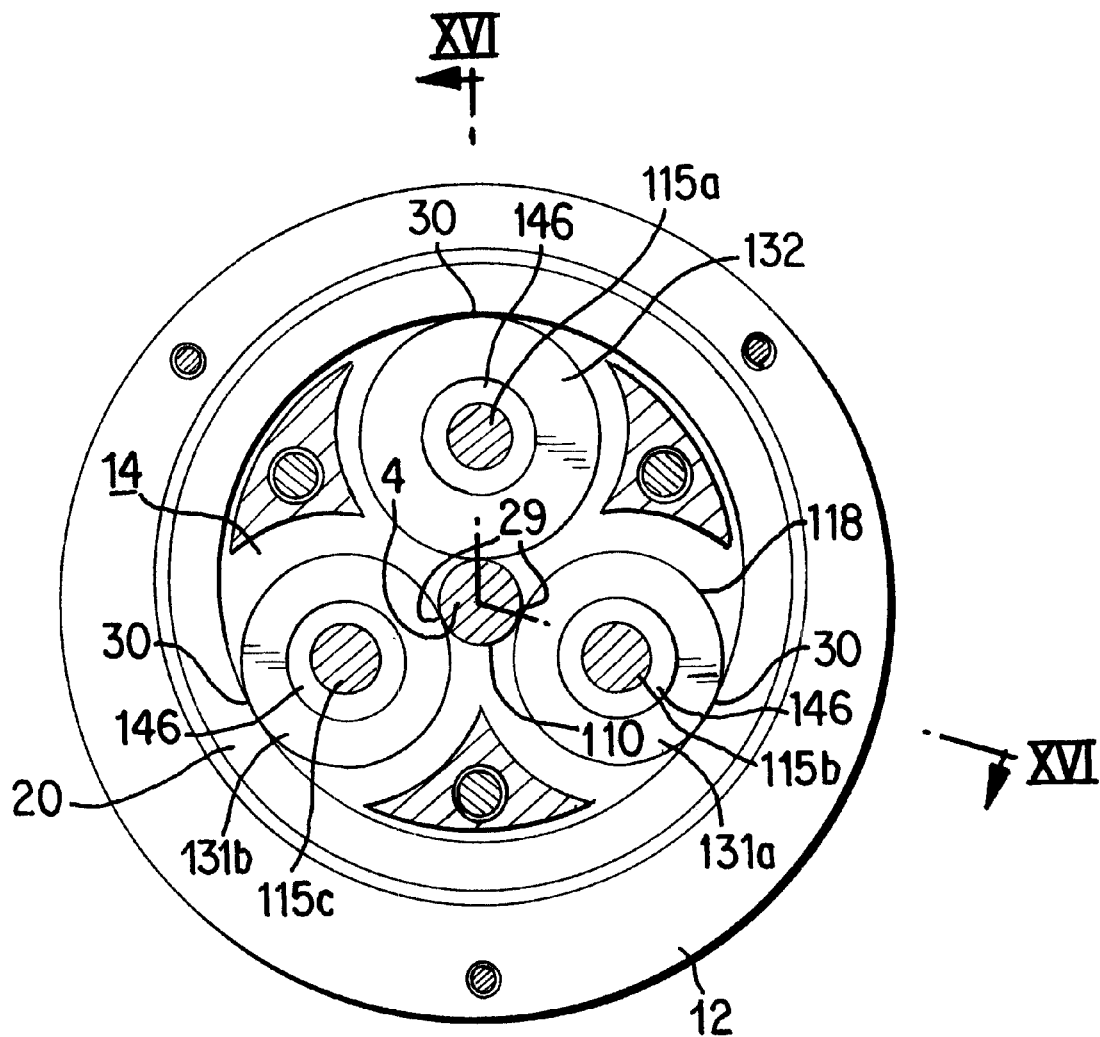
FIG. 17 is a cross sectional view taken along the line XVII—XVII of FIG. 16.

FIGS. 16 to 17 show another example of the embodiments in the speed changer of the friction roller type of the present invention, wherein the structure and functions other than those of the pivotal shafts 115a, 115b, 115c and intermediate rollers 132, 131a, 131b, around each pivotal shaft according to this example are substantially disclosed in U.S. Pat. No. 4,709,589 which is incorporated in the present specification by reference.

Illustrated in the drawings are a single guide roller 132 and two wedge rollers 131a, 131b as intermediate rollers which are formed with outer ring raceways 142 of the deep groove type on the inner peripheral surface at the intermediate portion thereof. On the other hand, the pivotal shafts 115a, 115b, 115c are formed with inner ring raceways 143 of the deep groove type on the outer peripheral surface at the intermediate portion thereof opposed to the outer ring raceways 142. A plurality of balls 144 are rotatably disposed between the outer ring raceways 142 and the inner ring raceways 143 and supported by the cage 145, respectively. The inner ring raceways 143, outer ring raceways 142 and balls 144 form bearings 146. Accordingly, the rollers 132, 131a, 131b are rotatably supported around the pivotal shafts 115a, 115b, 115c by the ball bearings 146 of the deep groove type in the state such that the displacement in the thrust direction is prohibited.

Incidentally, it is desirable that by providing the balls 144 with a necessary preload so as to provide the ball bearings 146 with no positive internal clearance but a negative internal clearance to eliminate plays from the ball bearings 146.

The rolling surfaces of the adjacent balls 144 are prevented from rubbing each other with the cages 145 to prevent the rotation resistance in the ball bearings 146 from increasing.

In the case where the radial load or thrust load applied to the ball bearings 146 is large, the cages 145 are omitted to increase the number of balls 144 between the outer ring raceways 142 and the inner ring raceways 143, which is a so-called full ball bearing. In this case, it is by shrink fitting or cooling fitting to install the balls 144 between the outer ring raceway 142 and the inner ring raceway 143.

In the example illustrated, the structure for connecting the outer drum 20 and the output shaft or second rotatable shaft 23 is different from that in the conventional structures as described in U.S. Pat. No. 4,709,589. Specifically, in the example illustrated, the opening portion at one end of the outer drum 20 (left end in FIG. 16) is closed by the disc plate portion 147, to the-central portion of the outer side face (left side portion in FIG. 16) of which the base end portion (right end portion in FIG. 16) of the output shaft 23 is fixed In a concentric relation with the outer drum 20. In addition, in the example illustrated, at the tip portion (left end portion in FIG. 16) of the input or first rotatable shaft 128, the central roller 4 is integrally formed and supported rotatably with reference to the housing 12 with deep grooved type bearing 148. The base end portion of the output shaft or second rotatable shaft 23 is also supported rotatably with reference to the housing 12 with a deep grooved type bearing 148.

As mentioned above, in the speed changer of the friction roller type in this example, the deep grooved ball bearings 146 are constructed by the outer ring raceways 142 formed on the inner peripheral surface at the central portion between the single guide roller 132 and the two wedge rollers 131a, 131b, the inner ring raceways 143 formed on the outer peripheral surface at the mid portion between the pivot shafts 115a, 115b, 115c, and a plurality of balls 144 provided between the outer ring raceways 142 and the inner ring raceways 143. The rollers 132, 131a, 131b are rotatably supported around the pivot shafts 115a, 115b, 115c by the ball bearings 146.

The deep grooved type ball bearings 146 support not only radial load but also thrust load. Accordingly, even if any thrust load is applied to the rollers 131a, 131b, 132, the displacement of the rollers 131a, 131b, 132 in the thrust direction can be prevented. Accordingly, the axial opposite end faces of the rollers 131a, 131b, 132 never rub the inner surface (left face in FIG. 16) of the cover 14 of the housing 12 or the inside surface (right face in FIG. 16) of the connecting plate 119 which are opposed to the end faces of the rollers 131a, 131b, 132.

Incidentally, there is no need of providing a thrust bearing between the axial opposite end faces of the rollers 131a, 131b, 132, the inner surface of the cover 14, and the inside surface of the connecting plate 119. However, when the clearance is particularly small between the opposed surfaces and a large thrust load is applied to cause the opposed surfaces so as to rub each other, as required, a thrust sliding bearing can be formed in a thin thickness and made of a resin of low friction coefficient such as polyamide resin, poly 4-fluroroethylen resin, polyacetal resin etc.

In the embodiments above, the present invention is applied to the structure where with three intermediate rollers, two are the wedge rollers 131a, 131b and the remained one is the guide roller 132. In such a structure, even if the input shaft 128 and the output shaft 23 are rotated in any direction, the contact pressure is secured at the contact portions 29 on the inner diameter side and at the contact portions 30 on the outer diameter side. However, the present invention can be applied to any type of speed changer of the friction roller type. For example, the rotation direction of the input and output shafts is always constant, one of the three intermediate rollers can be the wedge roller with the remained two being the guide roller. It is possible to apply the present invention to such structures, and to the conventional structure as shown in Japanese Patent Publication Toku Kai Hei No. 8-210455 where a central roller and an outer drum are arranged concentrically, and further to a speed increaser with the input and output shafts arranged in a manner contrary to the illustrated example.

Figure 18:
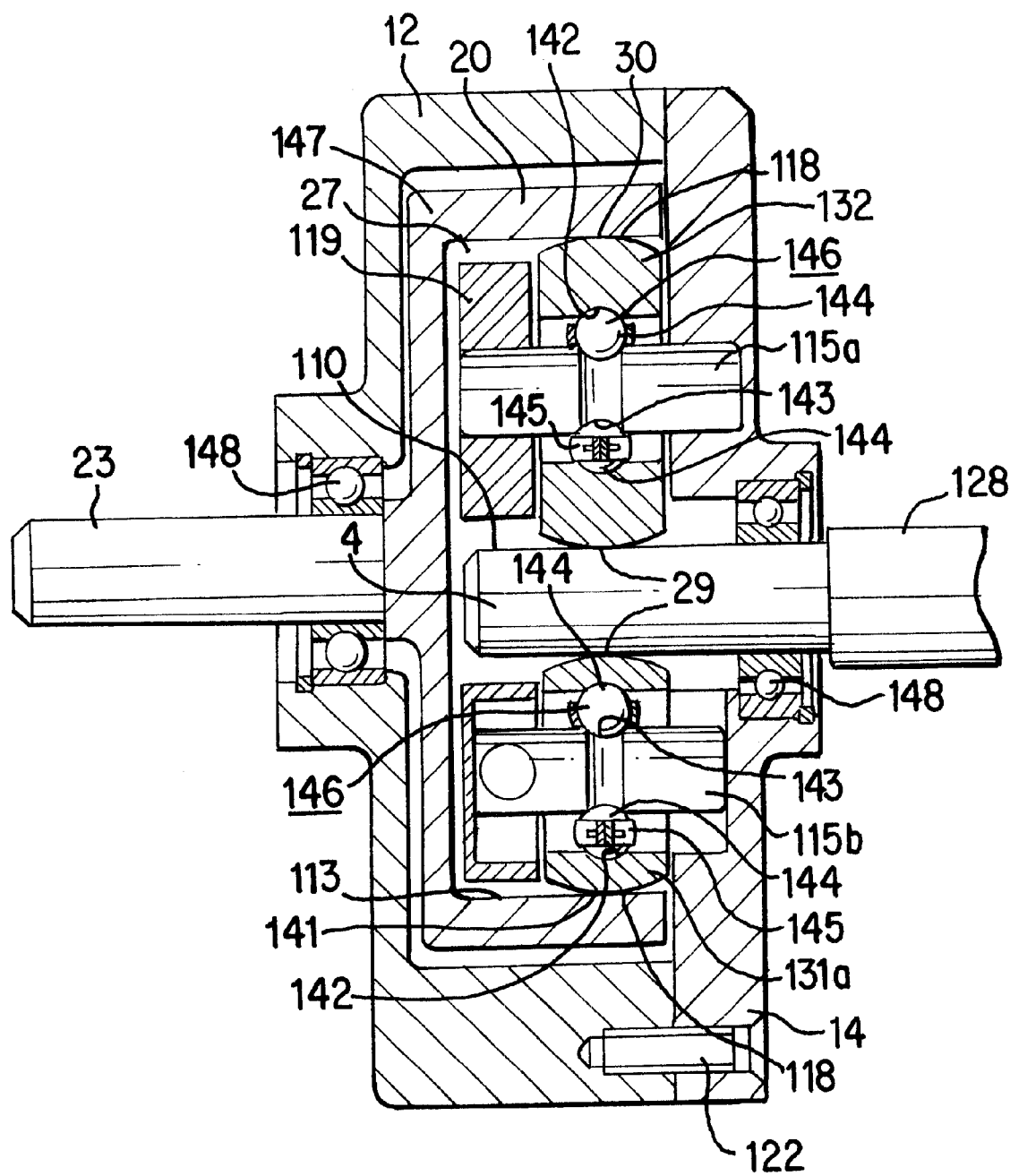
FIG. 18 is a diagrammatic cross sectional view of another example of the embodiments in the present invention.

FIG. 18 shows a modified structure of that in FIG. 16.

In the case of the friction roller type speed changer of FIG. 18, the single guide roller 132 and two wedge rollers 131a, 131b, is provided with crown on their outer peripheral surface. Specifically, the outer peripheral surface, that is the third cylindrical surfaces 118 of the rollers 132, 131a, 131b are formed in an arcuate convex shape in cross section with a small curvature or large radius of curvature. Accordingly, the outer diameter of the rollers 132, 131a, 131b is large at the intermediate portion and becomes gradually smaller as it is closer to the opposite ends.

On the other hand, the central roller 4 is provided with the. first cylindrical surface 110 on its outer peripheral surface and the outer drum 20 is provided with the second cylindrical surface 113 on its inner peripheral surface, the first cylindrical surface 110 and second cylindrical surface 113 being a simple cylindrical surface with no diametrical change in the axial direction.

Figure 19:
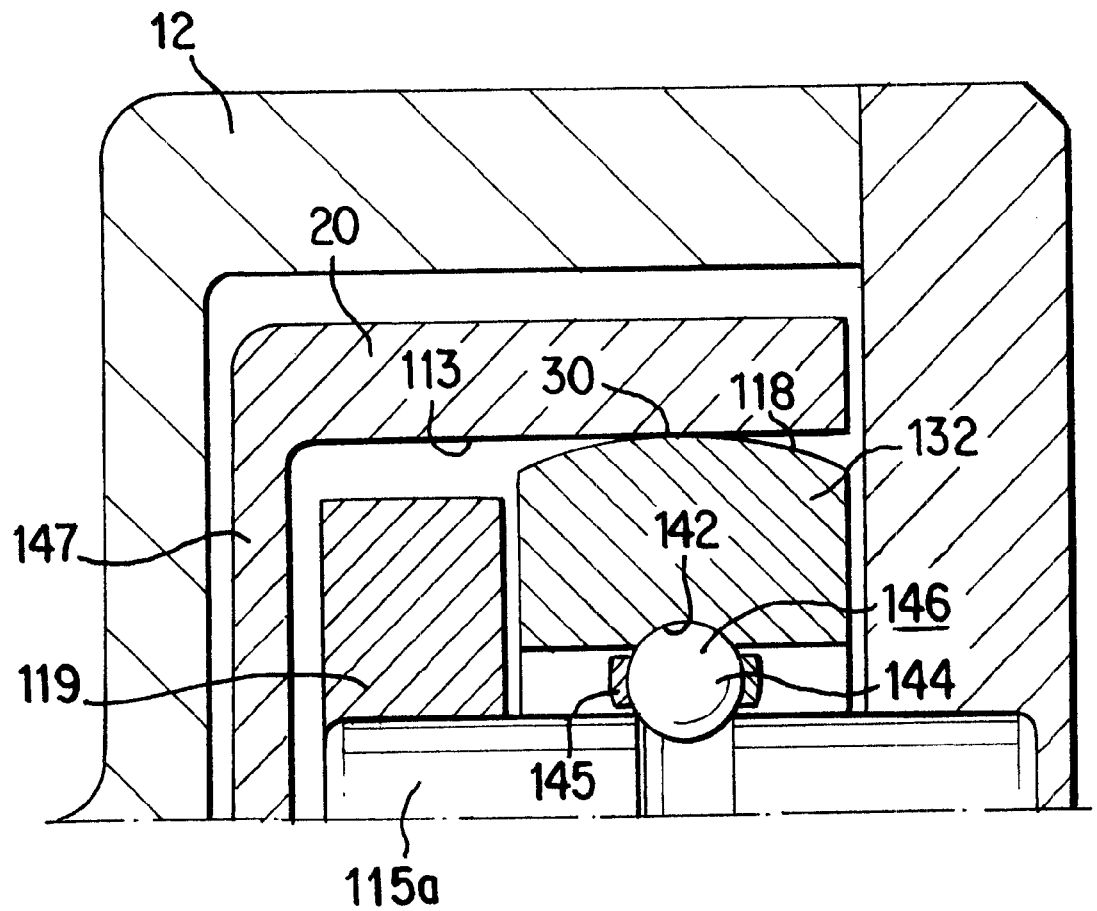
FIG. 19 is a cross sectional view of an upper portion of FIG. 18.

In the case of the friction roller type speed changer of FIGS. 18 and 19, even if the central axis of the first cylindrical surface 110 on the outer peripheral surface of the input shaft 128 and the central axis of the second cylindrical surface 113 on the inner peripheral surface of the outer drum 20 are not arranged in parallel with the pivot shafts 115a, 115b, 115c for the rollers 132, 131a, 131b, the outer and inner peripheral surfaces of the rollers 132, 131a, 131b do not come into edge contact with the mating surfaces. Specifically, when the axes are not placed in parallel with each other, the rollers 132, 131a, 131b are tilted with respect to the central axis of the first cylindrical surface 110 and the central axis of the second cylindrical surface 113, the third cylindrical surfaces 118 with crown, that is the outer peripheral surfaces of the rollers 132, 131a, 131b are conformed to the first cylindrical 110 and second cylindrical 113. Accordingly, the first cylindrical 110 and second cylindrical 113 do not come into edge contact with the third cylindrical surfaces 118, so that no excessive surface pressure is applied to the cylindrical surfaces 110, 113, 118.

Figure 20:
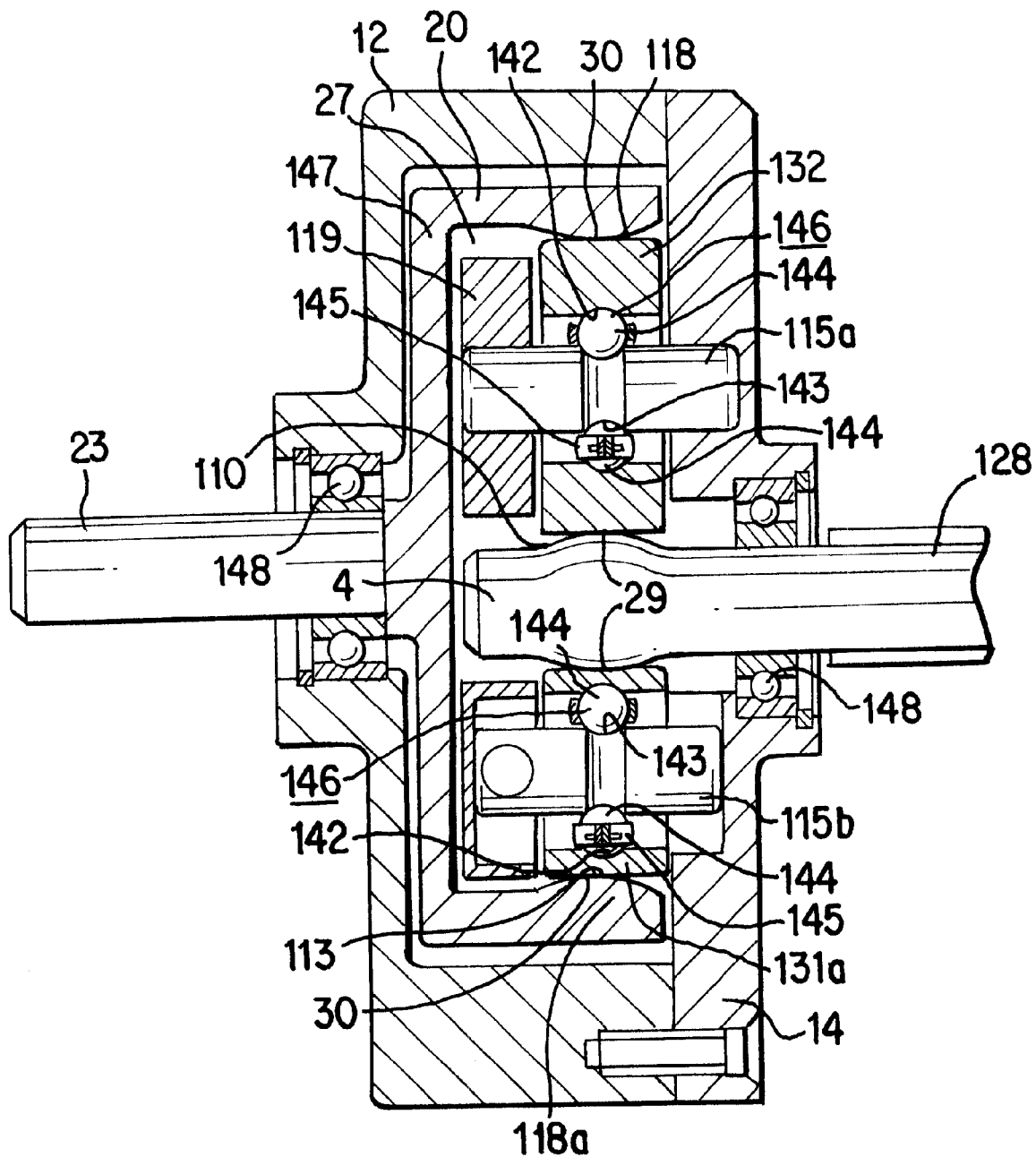
FIG. 20 is diagrammatic cross sectional view of another example of the embodiments in the present invention.

FIG. 20 shows another example of this embodiment, where the central roller 4 is provided with the first cylindrical surface 110 on its outer peripheral surface and the outer drum 20 is provided with the second cylindrical surface 113 on its inner peripheral surface, the first cylindrical surface 110 and second cylindrical surface 113 being provided with crown. The single guide roller or intermediate roller 132 and two wedge rollers 131a, 131b, are formed in a simple cylindrical surface with no crown.

In the case of this example, even when the central axis of the first cylindrical surface 110 on the outer peripheral surface of the input shaft 128 and the central axis of the second cylindrical surface 113 on the inner peripheral surface of the outer drum 20 are not arranged in parallel with the pivot shafts 115a, 115b (115c) for the rollers 132, 131a (131b), the outer and inner peripheral surfaces of the rollers 132, 131a (131b) do not come into edge contact with the mating surfaces.

Figure 21:
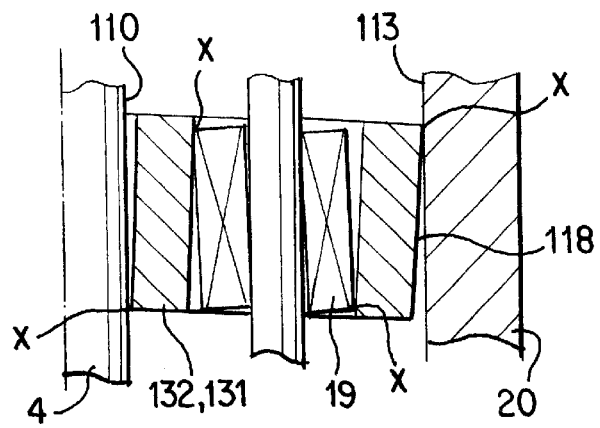
FIG. 21 is a cross sectional view of the wedge roller in a tilted state.

FIG. 21 shows an example of the edge contact when the needle bearing is used, where the first cylindrical surface 110, second cylindrlcal surface 113 are placed in edge contact with the third cylindrical surface 118. Also the inner peripheral surface of the intermediate roller 132 (131) is placed in edge contact with of the needles of the needle bearing 19.

In the examples illustrated in FIGS. 18 to 20, the deep grooved ball bearings 146 are used to support the rollers 132, 131a, 132b on the pivot shafts 115a, 115b, 115c, so that no edge load is applied to the rotatable support portions of the rollers 132, 131a, 132b.

However, even if the conventional radial needle bearing as shown in JP Publication No. Hei8-21045, and U.S. Pat. No. 4,709,589 is used in this rotating support section, the axial opposite ends of the rolling surface of the needle in the needle bearings never come in edge contact with the mating surface. The reason of this is as follows;

Specifically, in the case of the friction roller type speed changer of the present invention, since the third cylindrical surfaces 118 with the crown as mentioned above conform the cylindrical surfaces 110, 113 as in FIGS. 18 and 19, it is compensated that the rotatable central axis of the rollers 132, 131a, 131b is arranged in parallel with the pivot shafts 115a, 115b, 115c.

The deep groove type ball bearings 146 support not only the radial load but also the thrust load. Therefore, even if the thrust load is applied to the rollers 132, 131a, 131b, the displacement of the rollers 132, 131a, 131b In the thrust direction can be prevented. Accordingly, the axial opposite end faces never placed in a friction relationship with the mating surfaces, that is the inner surface (left surface in FIG. 18) of the cover 14 of the housing 12 or the inner side face (right surface in FIG. 18) of the connecting ring 119.

Incidentally, there is no need of providing a thrust bearing between the axial opposite ends of the rollers 132, 131a, 131b and the inner surface of the cover 14 of the housing 12 and the inner side face of the connecting ring 119. This is substantially the same to the example of FIG. 16.

Figure 22:
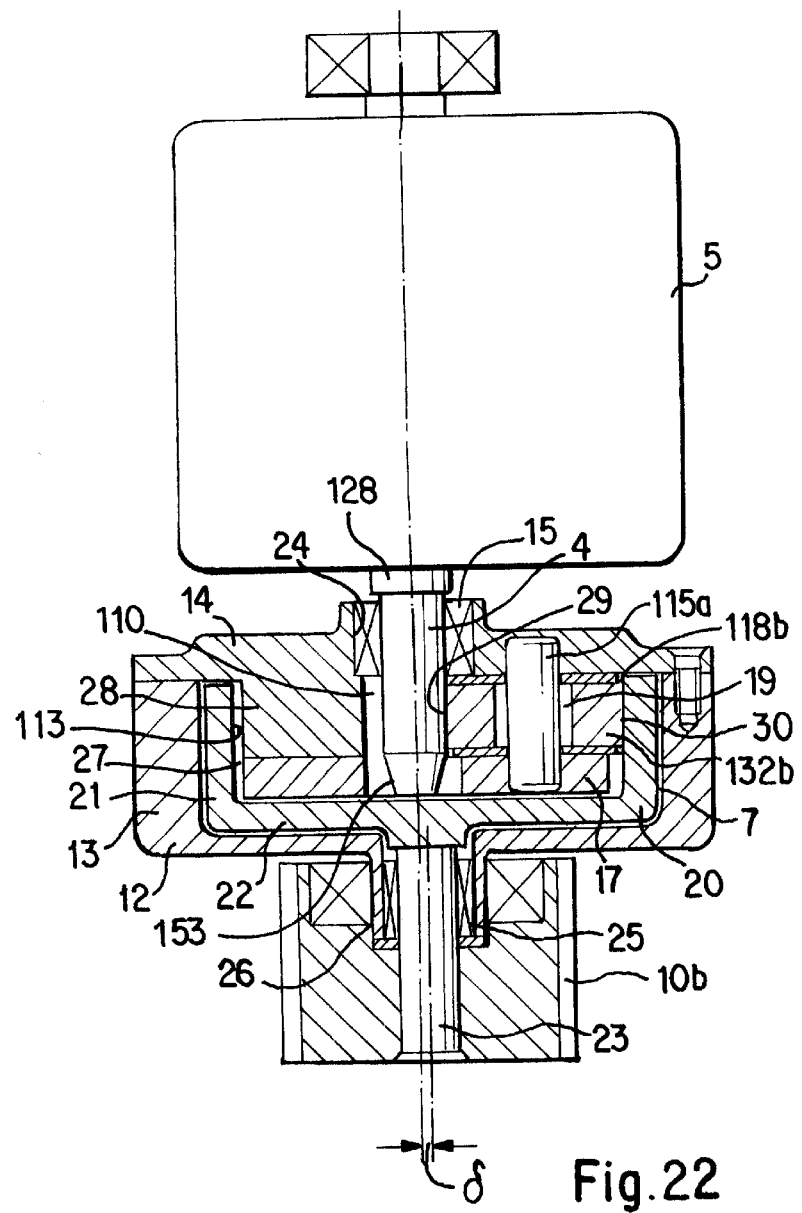
FIG. 22 is a partial cross sectional view similar to FIG. 3.

FIG. 22 shows a modification of the structure in FIG. 3.

In the friction roller type speed changer in FIG. 22, the central roller 4 surrounded by the intermediate rollers that is the wedge roller 131c and the two guide rollers 132a, 132b, the outer peripheral surface of the tip portion of the central roller 4 (FIG. 22, FIG. 24) is formed with a tapered portion 153 where the outer diameter becomes smaller as it is closer to the tip end. With this structure, the installation of the central roller 4 in position is easier.

Figure 23:
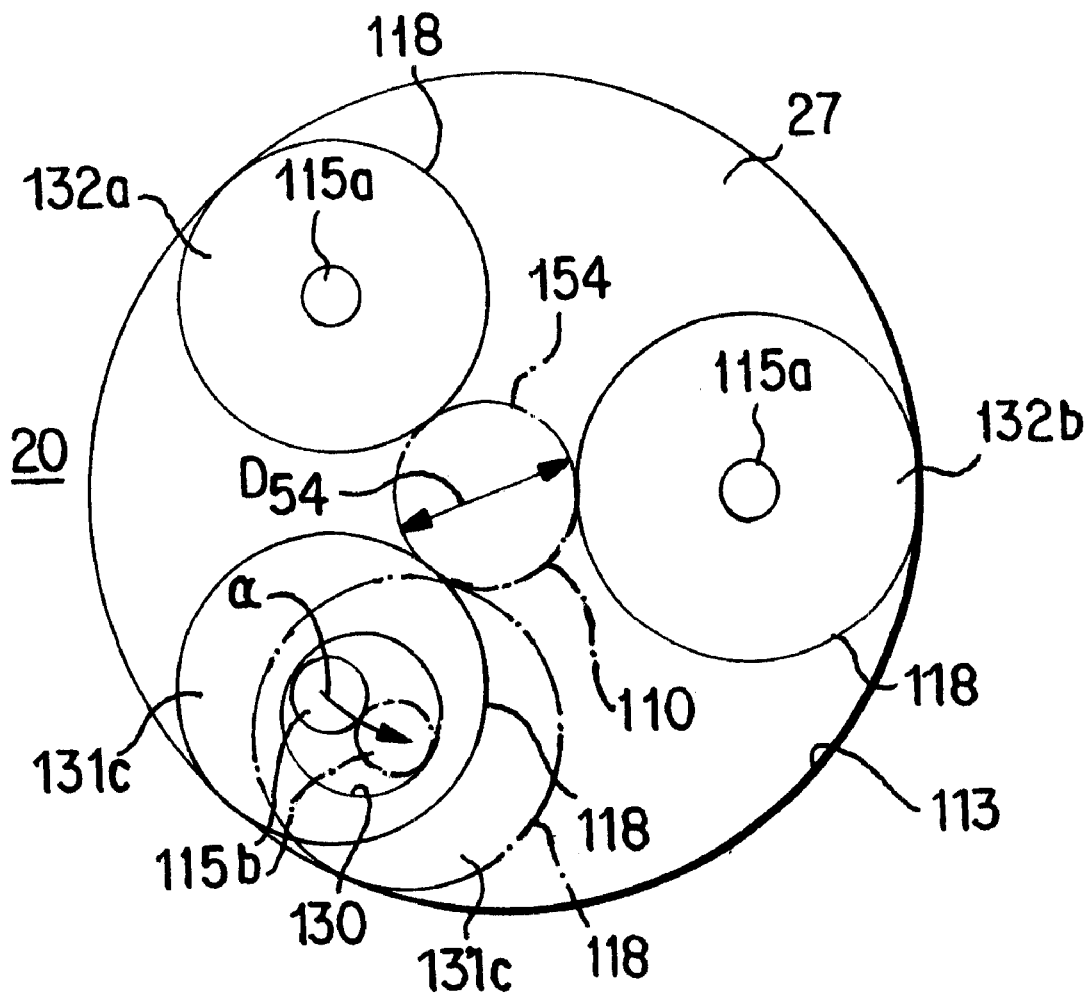
FIG. 23 is a diagrammatic cross sectional view to show a relation between the guide rollers and wedge roller.
Figure 24A:
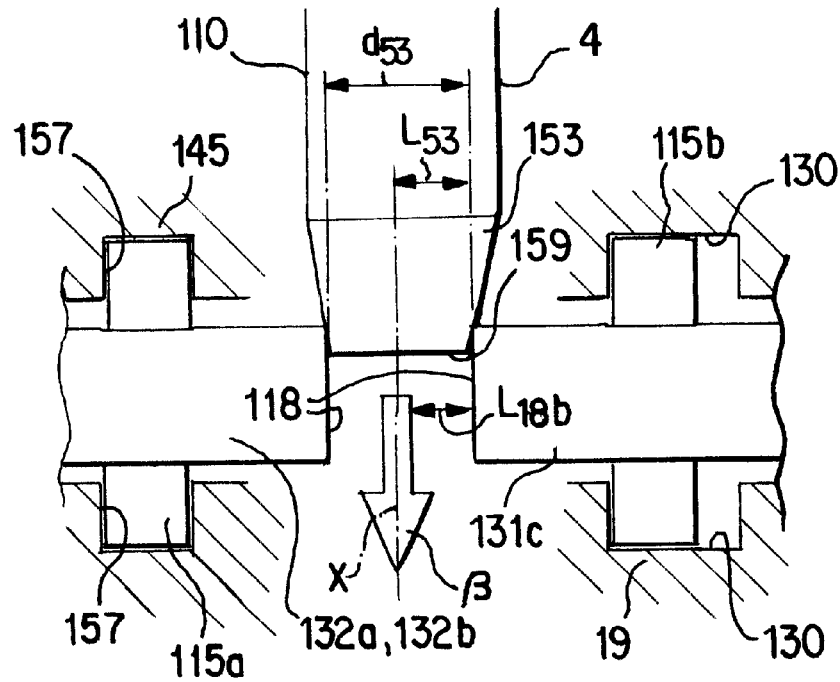
FIG. 24(A) and FIG. 24(B) are a diagrammatic cross sectional view to show a relation between the central roller and the wedge and guide rollers.
Figure 24B:
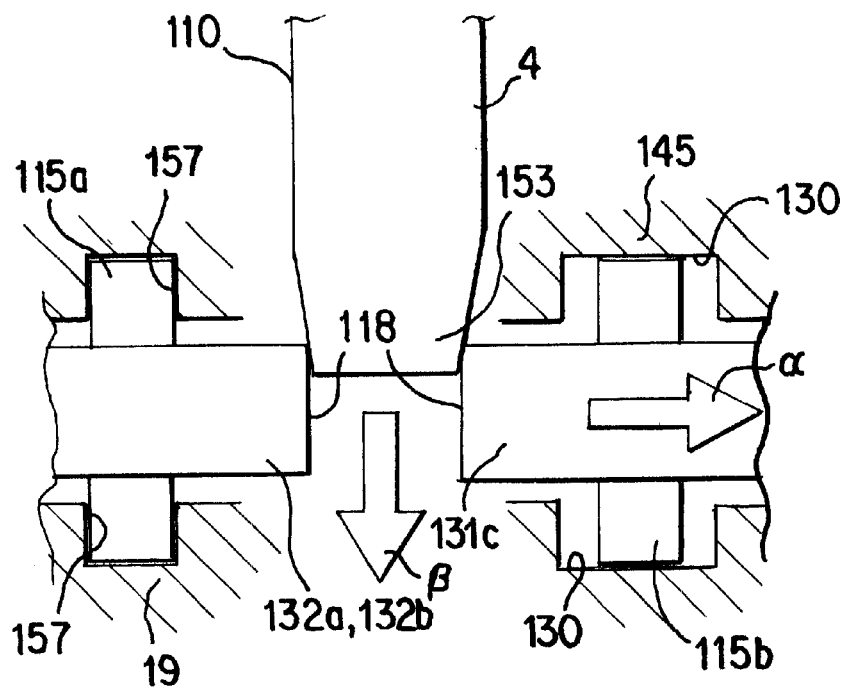

The outer diameter $d_{53}$ (FIG. 24(A)) of the tip end edge of the central roller 4 which is the smallest in the outer diameter in the tapered surface portion 153 is smaller than the diameter $D_{54}$ (FIG. 23) of the maximum inscribing circle 54 of the rollers 131c, 132a, 132b, that is $d_{53}<D_{54}$, in the state where the wedge roller 131c is completely moved in the direction to make narrow the space surrounded by the wedge roller 131c and the two guide rollers. 132a, 132b for inserting the central roller 4.

Specifically, based on the resilient force of the compression spring (see 43 in FIG. 7), in the state where the pivot shaft 115b is pushed onto the inner peripheral edge opposed to the compression coil spring of the support hole 130, that is in the state where the pivot shaft 115b and the wedge roller 131c are pushed onto the position indicated by the solid circle line in FIG. 23, the outer diameter $d_{53}$ of the tip end edge of the central roller 4 is smaller than the diameter $D_{54}$ of the maximum inscribing circle 154 of the rollers 131c, 132a, 132b.

Further, it is desirable that the outer diameter $d_{53}$ is smaller than the diameter $D_{54}$ which becomes further smaller in the state where the pivot shaft 115b is completely displaced inward in the diametrical direction of the outer ring 20 within the support hole 130.

In order to install the central roller 4 in the interior of the rollers 131c, 132a, 132b first as in FIG. 24(A), the tip end of the central roller 4 with a tapered surface portion 153 formed thereon is pushed into the interior surrounded by the rollers 131c, 132a, 132b. During this pushing step, the tapered surface portion 153 of the tip end of the central roller 4 causes the wedge roller 131c to move against the resilient force of the compression spring in the direction indicated with the arrow α toward the a portion of the annular space 27 where the width is wide, and increasing the diameter $D_{54}$ of the maximum inscribing circle 154 of the rollers 131c, 132a, 132b, the tip end penetrates into the interior surrounded by the rollers 131c, 132a, 132b as shown by the arrow β in FIG. 24. Accordingly, by pushing the central roller 4 further from the state of FIG. 24(B), the central roller 4 can be installed inside the intermediate rollers 131c, 132a, 132b as in FIG. 22.

In the friction roller type speed changer as illustrated in FIG. 24(A) having the tapered surface portion 153 as mentioned previously, the diameter of the tip end edge of the central roller 4 and the position of the third cylindrical surface 118 on the outer peripheral surface of the wedge roller 131c are controlled with reference to the hypothetical, central axis X of the central roller 4. Specifically, the length $L_{53}$ ($=d_{53}/2$) from the hypothetical central axis X to the tip end edge is smaller than the length $L_{18b}$ from the hypothetical central axis X to the third cylindrical surface 118 on the outer peripheral surface of the wedge roller 131c in the state closest to the hypothetic axis X.

In this example, by controlling the relation between the location of the tip end edge and the location of the third cylindrical surface 118b as previously mentioned, the interference between the tip end face 159 of the central roller 4 and the axial end face of the intermediate rollers including the wedge roller 131c is avoided, and the central roller 4 can be inserted radially inside the intermediate rollers. Specifically, the central roller 4 is guided by the bearing 15 (FIG. 22) and therefore little oscillated in a radial direction when inserted to the central portion surrounded by the intermediate rollers. Therefore, the interference can be efficiently prevented by controlling the relationship of the length $L_{53}$ and the length $L_{18b}$.

Incidentally, a curved connecting portion is formed in a smooth continuous surface between the first cylindrical surface 110 on the outer peripheral surface of the central roller 4 and the tapered surface 153 so as not to cause scuffing or scratch on the outer peripheral surface of the rollers 131c, 132a, 132b upon inserting the tip end of the central roller 4. Similarly, the outer peripheral edge portion of the rollers 131c, 132a, 132b It formed with a smooth continuous curved surface between its outer peripheral surface and its side surface so as not to damage the first cylindrical surface 110.

After the speed changer of the friction roller type is constructed with the central roller 4, and rollers 131c, 132a, 132b arranged at the predetermined position, with the transmission of rotating forces through the speed changer of the friction roller type, the contact pressure can be secured between the third cylindrical surfaces 118 on the outer peripheral surfaces of the single wedge roller 131c and two guide rollers 132a, 132b and the first and second cylindrical surfaces 110, 113 on the outer peripheral surface of the central roller 4 and inner peripheral surface of the outer ring 20.

In the example illustrated, during the transmission of the rotating forces through the speed changer of the friction roller type, the assembling direction of components is controlled so that the central roller 4 is rotated in the clockwise direction. This is similar to the example of FIG. 4, specifically as indicated with the arrow X in FIG. 4. The power supply to the motor 5, the pivot shafts 115a, 115b, and the central roller 4 correspond to the application of auxiliary force, the support shafts 16, 16a and the rotatable shaft 4 in FIG. 4, respectively.

Thus, the outer peripheral surface of the wedge roller 131c strongly pushes the outer peripheral surface of the central roller 4 and the inner peripheral surface of the outer ring 20. As a result, the contact pressure becomes high at the contact portion 29 on the inner diameter side between the outer peripheral surface of the wedge roller 131c and the outer peripheral surface of the central roller 4, and at the contact portion 30 on the outer diameter side between the outer peripheral surface of the wedge roller 131c and the inner peripheral surface of the outer ring 20.

As the contact pressure becomes high at the inner and outer contact portions 29, 30 with reference to the wedge roller 131c, at least one of the central roller 4 and outer ring 20 pushed by the outer peripheral surface of the wedge roller 131c is slightly displaced in a diametrical direction due to assembling clearance or elastic deformation etc. This is also similar to the example of FIG. 4.

Figure 26:
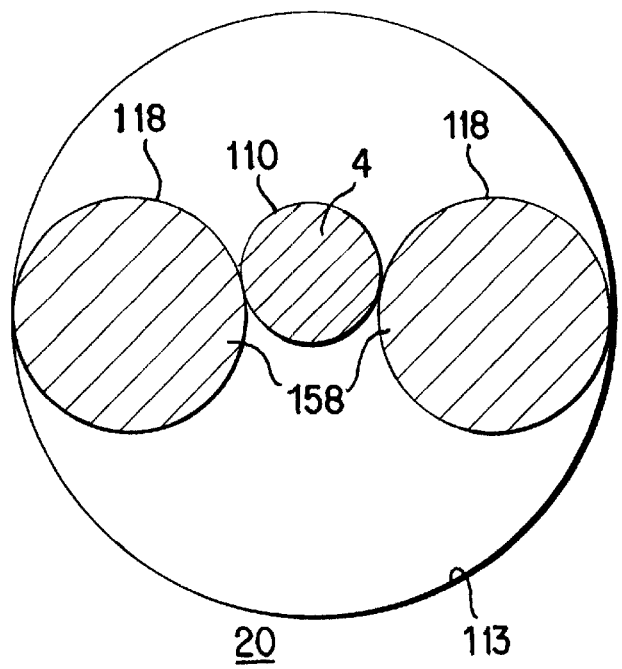
FIG. 26 is a diagrammatic cross sectional view to show a relation between the guide roller and wedge roller on the two intermediate roller arrangement.

In addition, the present example can be applied not only to the friction roller type speed change having three or more intermediate rollers but also to the one having two or more intermediate rollers. In the case of two intermediate rollers, as shown in FIG. 26, the intermediate rollers 158 are substantially opposed in the diametrical direction of the outer ring 20, and the central roller 4 is located between the intermediate rollers 158, so that the contact pressure of the cylindrical surfaces 110, 113, 118 can efficiently increased during operation of the wedge roller. One of the intermediate rollers 158 rotating in a fixed direction is the guide roller and the other is the wedge roller, while if the rotating direction is variable, both of them are the wedge roller.

Further, the present invention can be applied not only to the structure having a single wedge roller but also to the structure having two wedge rollers.

Figure 25:
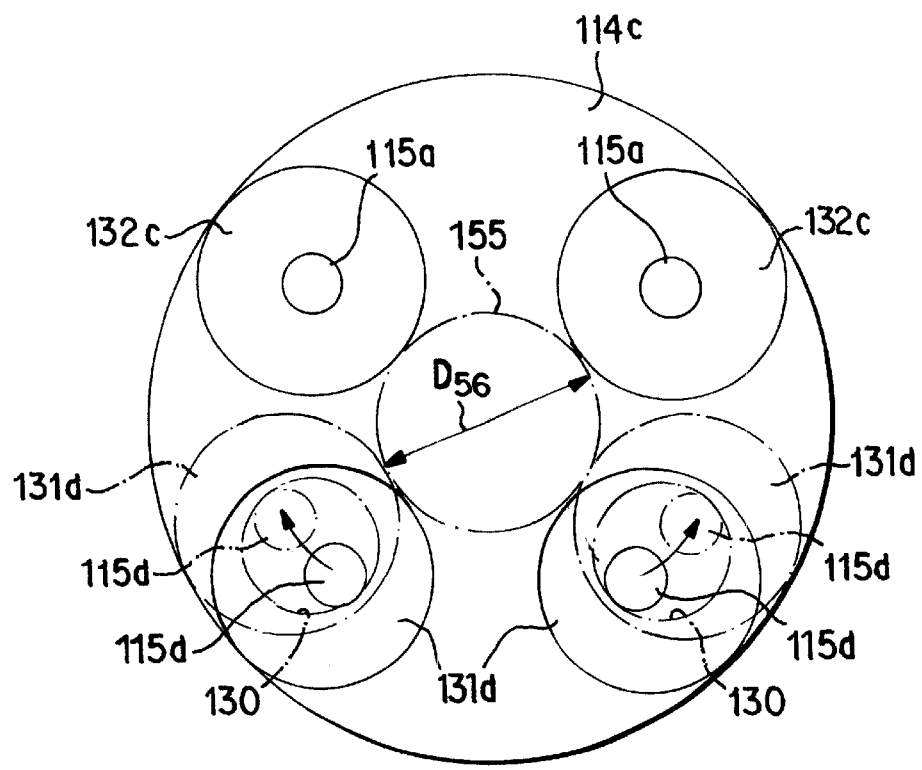
FIG. 25 is a diagrammatic cross sectional view to show a relation between the guide rollers and wedge roller in the four intermediate roller arrangement.

FIG. 25 illustrates an example of such embodiments of the friction roller type speed changer of the present invention, where four intermediate rollers are provided with the two ones being wedge rollers 131d with a relatively small diameter and with the other two being guide rollers 132c having a larger diameter than the wedge rollers 131d.

Also in the case of the friction roller type speed changer, the outer peripheral surface of the tip end portion of the central roller 4 (FIG. 22, FIG. 24) installed inside the four rollers 131d, 132c is formed with a tapered surface portion 153 as in the example of FIG. 22 and FIG. 24.

Specifically, in the present example, the outer diameter $d_{53}$ (FIG. 24(A)) of the tip end edge of the central roller 4 which is the smallest in the outer diameter in the tapered surface portion 153 is smaller than the diameter $D_{55}$ of the maximum inscribing circle 155 of the four rollers 131d, 132c in the state where the pair of wedge rollers 131d are completely moved in the direction to make narrow the space existing in the interior surrounded by the wedge roller 131d and the two guide rollers 132c to accommodate the central roller 4.

In the case of four intermediate rollers provided, the diameter of the maximum inscribing circle of three intermediate rollers selected in a combination from the four rollers may be different from the diameter of the maximum inscribing circle of three intermediate rollers selected in another combination from the four rollers. In this case, the outer diameter $d_{53}$ of the tip end edge of the central roller 4 is smaller than the diameter of the minimum one of the maximum inscribing circles.

Figure 27:
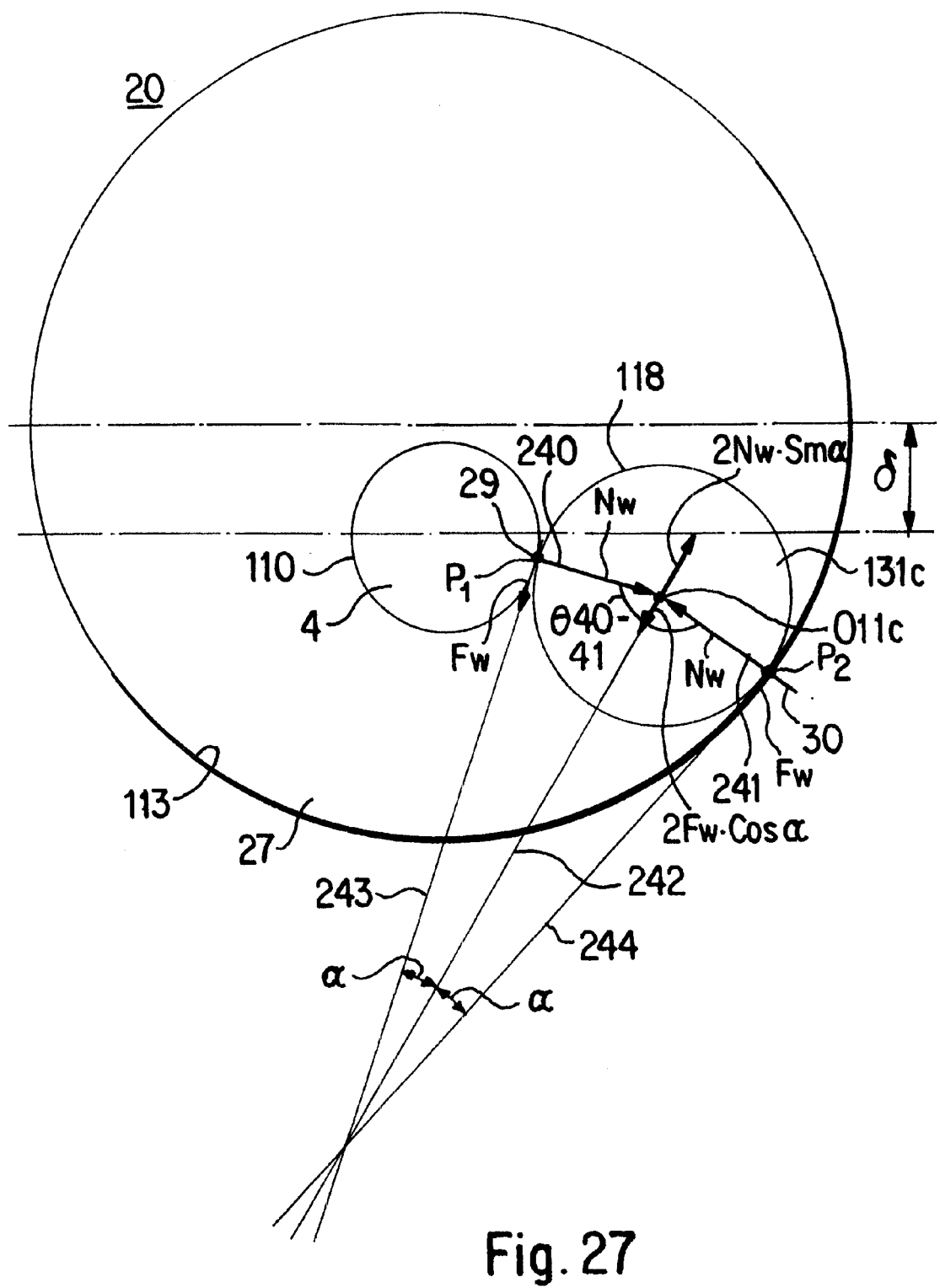
FIG. 27 is a schematic view in the direction as in FIG. 4 to explain the wedge angle.
Figure 28:
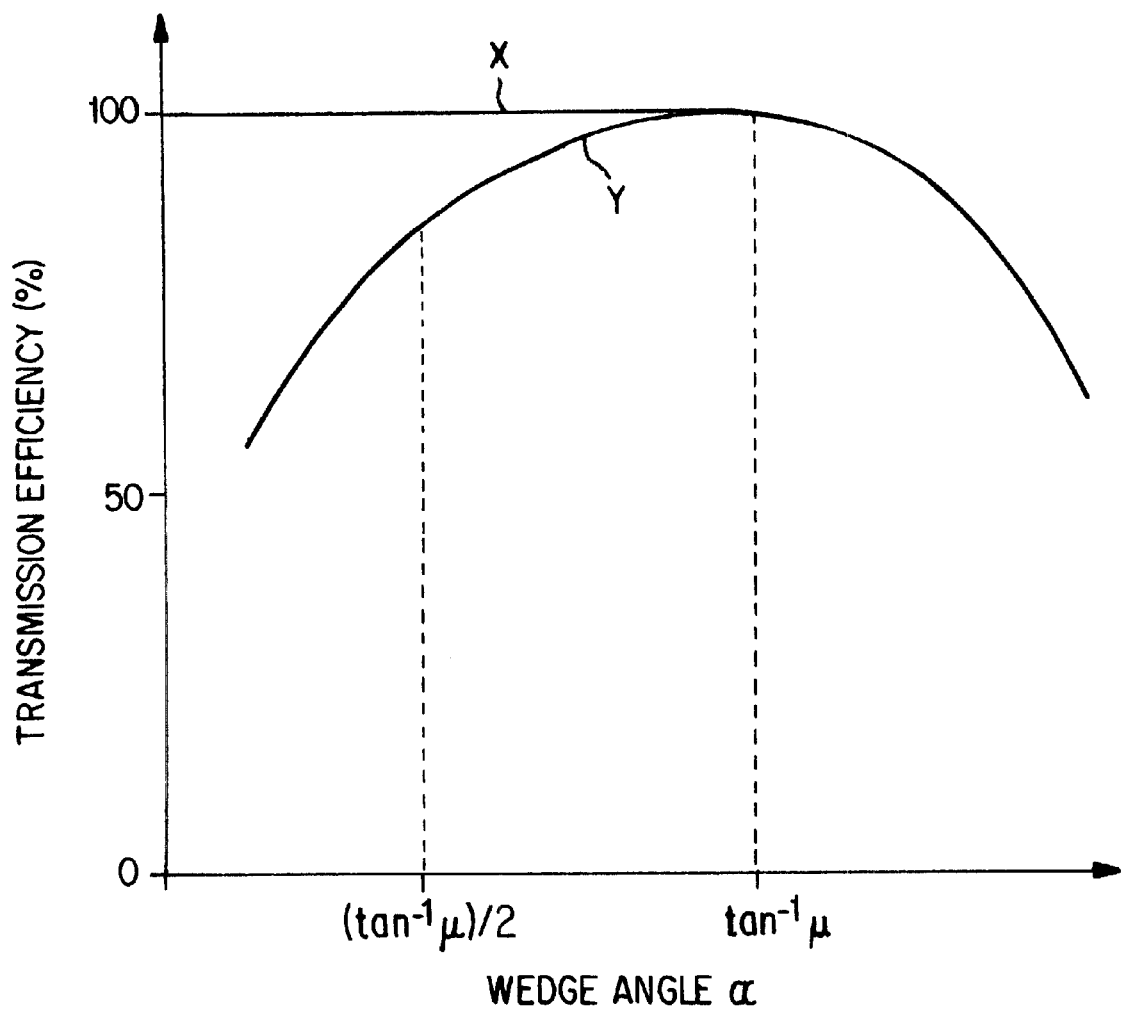
FIG. 28 is a graph to show a relation between the wedge angle and the transmission efficiency.

FIGS. 27 to 29 shows a wedge angle $\alpha$ which is determined by the amount of displacement $\delta$ of the through hole 24 from the center of the housing 12 in the speed changer of the friction roller type in the present invention.

The wedge angle $\alpha$ is controlled to limit the contact pressure at the contact pressure at the contact portions 29, 30 on the inner and outer diameter sides.

The following is a serrates of steps to determine the wedge angle $\alpha$.

The contact portions 29, 30 between the third cylindrical surface 118 on the outer peripheral surface of the wedge roller, the second cylindrical surface 113 on the inner peripheral surface 113 on the inner peripheral surface of the outer ring 20 and the first cylindrical surface 110 on the outer peripheral surface of the central roller 4 is supposed to have a traction coefficient $\mu$.

The central point $O_{llc}$ of the wedge roller is connected to the first contact point $P_1$ between the third cylindrical surface 118 and the first cylindrical surface 110 with the first straight line 240. the first contact point $P_1$ is located at the center of the inner diameter side contact portion 29 with reference to the wedge roller 131c.

In addition, the central point $O^{11c}$ is connected to the second contact point $P_2$ between the third cylindrical surface 118 and the second cylindrical surface 113 on the inner peripheral surface of the outer ring 20 with the second straight line 241. The second contact point $P_2$ is located at the center of the outer diameter side contact portion 30, with reference to the wedge roller 132c.

The third straight line 242 passes through the central point $O_{11c}$ in the condition that the cross angle $\theta_{40-41}$ between the first straight line 240 and second straight line 241 is divided equally.

The fourth straight line 243 extends at right angles with reference to the first straight line 240 and passes through the first contact point $P_1$, and the fifth straight line 244 extends at right angles with reference to the second straight line 241 and passes through the second contact point $P_2$.

The wedge angle $\alpha$ is defined by the third straight line 242 and the fourth straight line 243 and by the third straight line 242 and the fifth straight line 244.

The wedge angle $\alpha$ is determined by the relation with the traction coefficient $\mu$, that is $\alpha \leq \tan^{-1}\mu$.

More desirably, the wedge angle $\alpha$ is limited in the relation of $(\tan^{-1}\mu)/2 \leq \alpha \leq \tan^{-1}\mu$.

The wedge angle $\alpha$ is, as clear in geometry, changes corresponding to the displacement amount $\delta$ of the through hole 24 from the center of the housing 12.

Specifically, the wedge angle $\alpha$ is related with the displacement amount $\delta$, diameters $D_{22a}$, $D_{17a}$ and $D_{18a}$ of the first, second and third cylindrical surfaces 110, 113, 118 as in the following equation.

This equation is determined by the cosine theorem.

$$\alpha = \cos^{-1}[\{(D_{22a}+D_{18a})^2+(D_{17a}-D_{18a})^2-\delta^2\}/\{(D_{22a}+D_{18a})\cdot(D_{17a}-D_{18a})\}].$$

The wedge angle $\alpha$ determined in this equation is limited in the range as mentioned above to keep high the transmission efficiency of the friction roller type speed changer as detailed hereinafter.

During operation of the friction roller type speed changer, specifically in the illustrated example, during the power transmission from the central roller 4 to the outer ring 20, the wedge roller 131c receives a tangent force Fw at the inner diameter side contact point 29 in the direction of the fourth straight line 243 as transmitted from the central roller 4 to the wedge roller 131c.

As a result, the force having a magnitude 2Fw·cosα is applied to the wedge roller 131c in the direction of the third straight line 242, so that the wedge roller 131c is displaced toward the narrow width portion in the annular space 27.

As a result of the displacement of the wedge roller 131c toward the narrow width portion in the annular space 27, provided that at the contact portions 29, 30 on the inner and outer diameter sides, a vertical force having the magnitude Nw is exerted onto the first cylindrical surface 110 of the central roller 4 in the direction vertical to the first cylindrical surface 110, the traction force Tw for torque transmission produced at the contact portions 29, 30 on the inner and outer diameter sides is represented by the following equation:

$$Tw = \mu \cdot Nw \quad \text{(Eq. 1)}$$

On the other hand, the vertical force Nw produces a pull force to displace the wedge roller 131c toward the wide width portion in the annular space 27. The pull force has a magnitude of 2Nw·sinα and applied in the direction opposite to the force of 2Fw·cosα.

Taking into consideration the balance in forces in the various directions, that is 2Fw·cosα=2Nw·sinα, the following equation is obtained.

$$Fw = Nw \cdot \tan\alpha \quad \text{(Eq. 2)}$$

In order to transmit power with no slip caused at the inner and outer diameter side contact portions 29, 30, the following equation must be satisfied between the tangent force Fw to be transmitted and the traction force Tw.

$$Fw \leq Tw \quad \text{(Eq. 3)}$$

From Eq. 3 into which Eqs. 1 and 2 are introduced, Nw·tanα≤μ·Nw and then put in order to obtain the result of tan α≤μ.

Accordingly, with the relation of α≤tan$^{-1}$μ satisfied, power transmission can be achieved with no slip caused at the inner and outer diameter contact portions 29, 30 and with no reduction in transmission efficiency caused slip in the friction roller type speed changer.

However, even when the wedge angle α is adopted to satisfy the equation of α≤tan$^{-1}$μ, if the wedge angle α is too small, the traction force Tw is excessively large comparing with the tangent force Fw to be transmitted.

The amount by which the traction force Tw is larger than the tangent force Fw is essentially not necessary for transmission of the tangent force Fw, and exhausted in resilient deformation etc. at the various components of the friction roller type speed changer; which is a loss portion in power transmission.

Therefore, by limiting the wedge angle α to satisfy the equation of (tan$^{-1}$μ)/2α, the traction force Tw is prevented from being too large, and the contact pressure at the contact portions 29, 30 prevented from being too large, so that the transmission efficiency is prevented from being reduced due to excessive contact pressure.

FIG. 28 show a theoretical relation between the wedge angle α and the transmission efficiency. When the wedge angle α is larger than tan$^{-1}$μ, a slip is caused at the inner and outer diameter side contact portions 29, 30, the transmission efficiency suddenly drops as the wedge angle α increases.

On the other hand, the wedge angle α is smaller than tan$^{-1}$μ the loss portion, that is the difference between the straight line X and the curve line Y in FIG. 28, progressively increases with the transmission efficiency progressively decreased.

And then, the wedge angle α is smaller than (tan$^{-1}$μ)/2, the transmission efficiency outstandingly drops due to the loss portion.

In a more desirable specific structure, a traction oil having a traction efficiency μ of 0.04 to 0.12 is provided in the respective contact portions 29, 30 to satisfy the equation of (tan$^{-1}$μ/2≤α≤tan$^{-1}$μ). In this case, the wedge angle α meets the equation of (tan$^{-1}$0.04)/2=1.15 degrees ≤α≤tan$^{-1}$0.12= 6.84 degrees.

"Idemitsu Trybo Review No. 12" (page 40) discloses some lubricant oils which can be used for the friction roller type speed changer of the present invention. The diagram on this page 40 is incorporated into the present specification by reference.

On the other hand, as a lubricant oil desirably used in the friction roller type speed changer, traction oils with high traction coefficient can be desirable.

The traction coefficiencies of the traction oils are varied with oil components and temperature, but almost included in the range of 0.04 to 0.12. Therefore, by introducing the value μ of from 0.04 to 0.12 into the equation of (tan$^{-1}$μ)/ 2≤α≤tan$^{-1}$μ, the value of the wedge angle α is determined in the range of 1.01 degrees to 6,84 degrees.

What is claim is:

1. A bicycle having wheels, a pair of pedals for driving the wheels, a pair of cranks connected to the pedals, and a reduction gear apparatus comprising:

a pedal shaft connected to the pair of cranks to be rotatingly driven through the pair of pedals by an outer force, a battery for providing electric power, an electric motor adapted to be driven by the electric power from the battery and having a rotatable shaft for power output, said rotatable shaft having an outer peripheral surface, and a traction roller reduction gear comprising:

an output shaft having an outer peripheral surface, a housing having a support shaft fixed thereto, said rotatable shaft being rotatably supported by the housing around a first rotation center, an outer ring rotatingly having a rolling inner peripheral surface portion, connected to the output shaft, and supported by the housing around a second rotation center, such that the second rotation center is eccentric with respect to the first rotation center, a wedging roller having a rolling outer peripheral surface portion, provided in a space between the rotatable shaft and the outer ring, the wedging roller being movable around the rotatable shaft toward a narrow portion in the space between the rotatable shaft and the outer ring until the rolling outer peripheral surface portion of the wedging roller comes into contact with the outer peripheral surface of the rotatable shaft and with the rolling inner peripheral surface portion of the outer ring, and a guide roller having a rolling outer peripheral surface portion, provided in contact with the outer peripheral surface of the rotatable shaft and the rolling inner peripheral surface portion of the outer ring, and rotatably supported by the support shaft fixed to the housing, wherein the pedal shaft is capable of driving the outer ring.

2. The bicycle of claim 1, wherein the wedging roller has a shaft and the reduction gear contains a resilient member to push the shaft of the wedging roller, such that the wedging roller is moved by the resilient member around the rotatable shaft toward the narrow portion in the space between the rotatable shaft and the outer ring.

3. A bicycle having a pair of pedals for driving wheels and a traction roller reduction gear, the reduction gear comprising:

a pedal shaft to be rotatingly driven through the pair of pedals by an outer force, input and output shafts each having an outer peripheral surface, a housing having a support shaft fixed thereto, said input shaft being rotatably supported by the housing around a first rotation center, an outer ring rotatably having a rolling inner peripheral surface portion, connected to the output shaft, and supported by the housing around a second rotation center, such that the second rotation center is eccentric with respect to the first rotation center, a wedging roller having a shaft and a rolling outer peripheral surface portion, provided in a space between the input shaft and the outer ring, a guide roller having a rolling outer peripheral surface portion, provided in contact with the outer peripheral surface of the input shaft and the rolling inner peripheral surface portion of the outer ring, and rotatably supported by the support shaft fixed to the housing, and a resilient member to push the shaft of the wedging roller, such that the wedging roller is moved by the resilient member around the input shaft toward a narrow portion in the space between the input shaft and the outer ring until the rolling outer peripheral surface portion of the wedging roller comes into contact with the outer peripheral surface of the input shaft and with the rolling inner peripheral surface portion of the outer ring, wherein the pedal shaft is capable of driving the outer ring.

4. The bicycle of claim 2, wherein the resilient member pushes the shaft of the wedging roller with a force between 150 grams and 1,000 grams.

5. The bicycle of claim 3, wherein the resilient member pushes the shaft of the wedging roller with a force between 150 grams and 1,000 grams.

* * * * *